(12) United States Patent
Jyumonji et al.

(10) Patent No.: US 7,247,813 B2
(45) Date of Patent: Jul. 24, 2007

(54) CRYSTALLIZATION APPARATUS USING PULSED LASER BEAM

(75) Inventors: Masayuki Jyumonji, Yokohama (JP); Hiroyuki Ogawa, Nara (JP); Masato Hiramatsu, Tokyo (JP); Noritaka Akita, Hiratsuka (JP); Tomoya Kato, Yokohama (JP)

(73) Assignee: Advanced LCD Technologies Development Center Co., Ltd., Yokohama-shi (JP)

( * ) Notice: Subject to any disclaimer, the term of this patent is extended or adjusted under 35 U.S.C. 154(b) by 0 days.

(21) Appl. No.: 11/246,265

(22) Filed: Oct. 11, 2005

(65) Prior Publication Data

US 2006/0131289 A1 Jun. 22, 2006

(30) Foreign Application Priority Data

Oct. 13, 2004 (JP) ............................. 2004-299222
Sep. 22, 2005 (JP) ............................. 2005-275866

(51) Int. Cl.
*B23K 26/00* (2006.01)
*H01L 21/268* (2006.01)

(52) U.S. Cl. ............................. 219/121.83; 219/121.65
(58) Field of Classification Search ........... 219/121.65, 219/121.66, 121.83, 121.62; 438/166, 795
See application file for complete search history.

(56) References Cited

U.S. PATENT DOCUMENTS

| 6,323,457 | B1 * | 11/2001 | Jung ..................... 219/121.83 |
| 6,506,636 | B2 * | 1/2003 | Yamazaki et al. .......... 438/166 |
| 6,933,185 | B2 * | 8/2005 | Wada et al. ................ 438/166 |
| 7,009,140 | B2 * | 3/2006 | Partio et al. ........... 219/121.65 |
| 2004/0115931 | A1 * | 6/2004 | Liu et al. .................... 438/795 |
| 2005/0002016 | A1 * | 1/2005 | Tsao ............................ 356/30 |

FOREIGN PATENT DOCUMENTS

| JP | 2001-102323 A | * | 4/2001 |
| JP | 2001-246484 | | 9/2001 |
| JP | 2004-228486 A | * | 8/2004 |

OTHER PUBLICATIONS

Masakiyo Matsumura, "Preparation of Ultra-Large Grain Silicon Thin-Films by Excimer-Laser", Journal of the Surface Science Society of Japan, vol. 21, No. 5, Mar. 28, 2000, pp. 34-43.

* cited by examiner

*Primary Examiner*—Geoffrey S. Evans
(74) *Attorney, Agent, or Firm*—Oblon, Spivak, McClelland, Maier & Neustadt, P.C.

(57) ABSTRACT

In a laser processing method and a laser processing apparatus which irradiate a processing target body with a laser beam pulse-oscillated from a laser beam source, a processing state is monitored by a photodetector, and the laser beam source is again subjected to oscillation control on the moment when erroneous laser irradiation is detected, thereby performing laser processing. Further, in a laser crystallization method and a laser crystallization apparatus using a pulseoscillated excimer laser, a homogenizing optical system, an optical element and a half mirror are arranged in an optical path, light from the half mirror is detected by a photodetector, and a light intensity insufficient irradiation position is again irradiated with a laser beam to perform crystallization when the detection value does not fall within a range of a predetermined specified value.

7 Claims, 26 Drawing Sheets

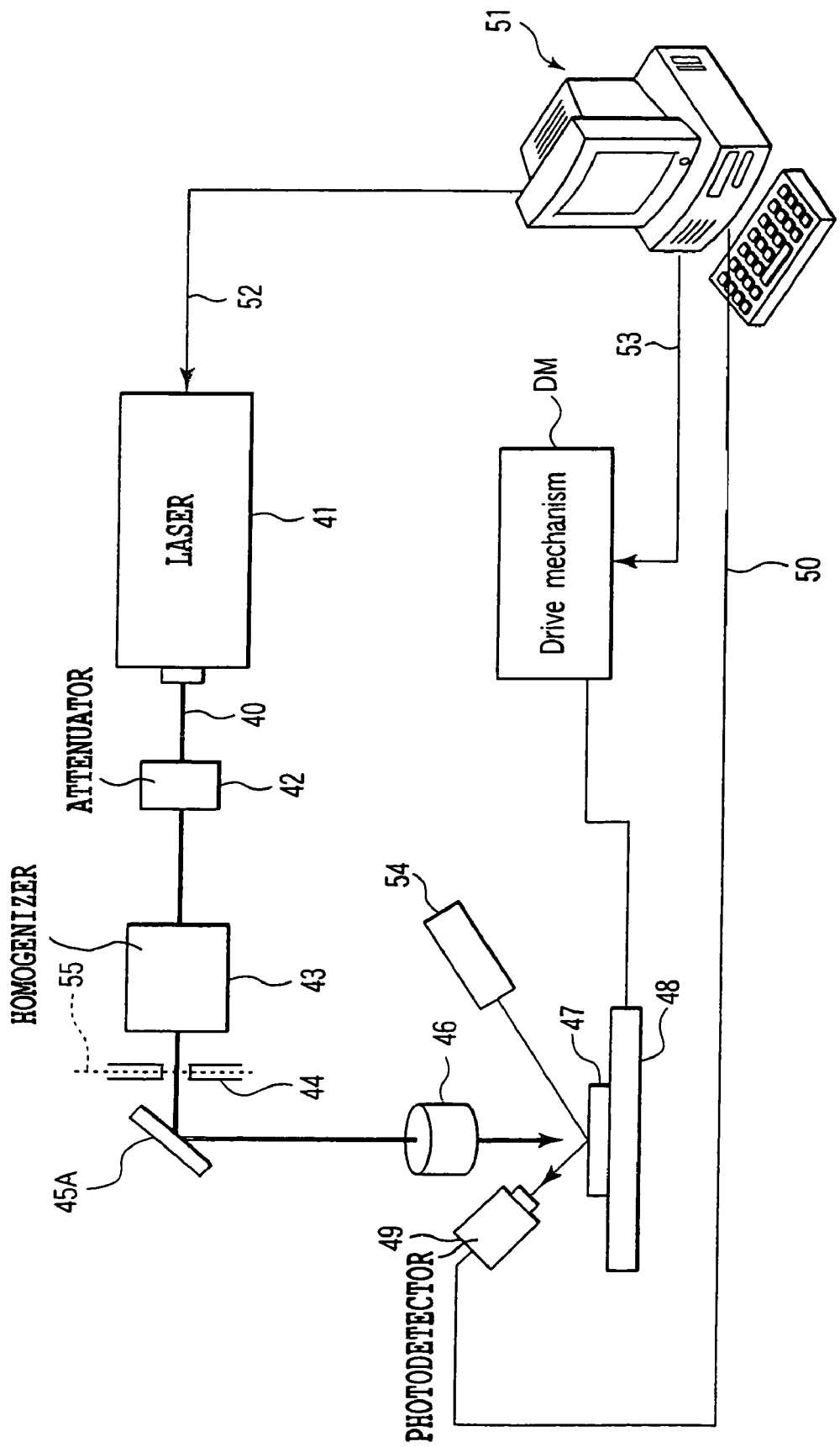
F I G. 9

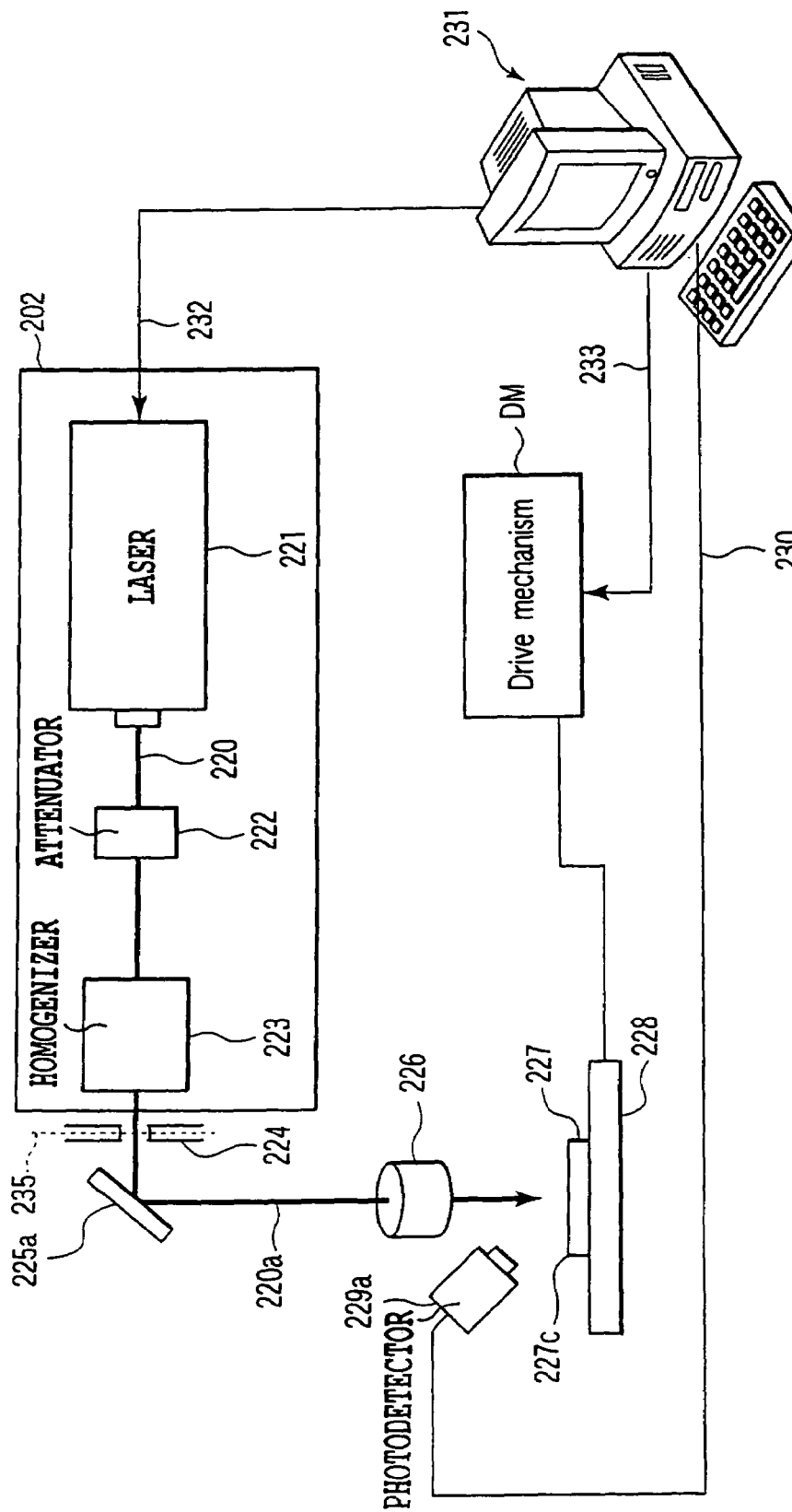
F I G. 13D

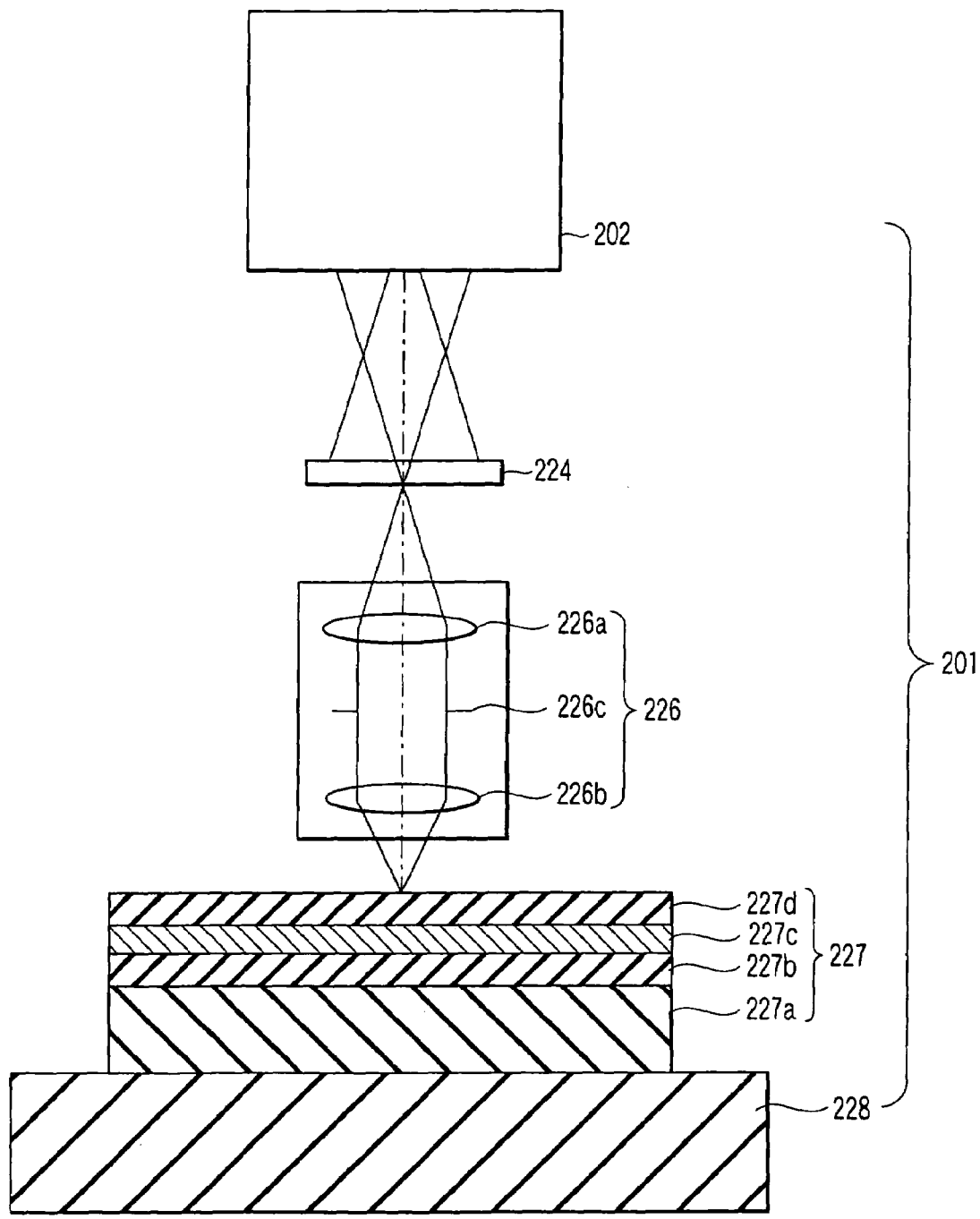
F I G. 21

CRYSTALLIZATION APPARATUS USING PULSED LASER BEAM

CROSS-REFERENCE TO RELATED APPLICATIONS

This application is based upon and claims the benefit of priority from prior Japanese Patent Applications No. 2004-299222, filed Oct. 13, 2004; and No. 2005-275866, filed Sep. 22, 2005, the entire contents of both of which are incorporated herein by reference.

BACKGROUND OF THE INVENTION

1. Field of the Invention

The present invention relates to a processing method using a pulsed laser beam, a processing apparatus using a pulsed laser beam which carries out this method, crystallization method using a pulsed laser beam, a laser crystallization apparatus which carries out this method, and a display device.

2. Description of the Related Art

A machining technology using an excimer laser which is a pulsed laser beam has been extensively studied and developed for process applications such ablation (evaporation), heating or melting. In recent years, an ablation technology has been extensively reviewed with respect to soft organic matters such as plastic, or ceramic, quartz and others which are called machining hard materials in particular. Since an excimer laser has a high photon energy (equal to or above 5 eV) and thereby directly acts on coupling between molecules, high machining performance is realized.

The excimer laser processing technology has been extensively used for, e.g., activation using an excimer laser beam intended to activate a semiconductor implanted layer, quartz ablation (evaporation) for forming a fiber grating, machining of a nozzle in an inkjet printer or the like.

In usual laser processing, continuous machining is carried out. Even if a light intensity of laser irradiation is not normal, machining is continued, and a method of again machining (repairing) that part is used later. For example, Jpn. Pat. Appln. KOKAI Publication No. 2001-246484 discloses a processing method which again performs laser irradiation with respect to a non-normal machining point if a light intensity of laser beam irradiation is not normal.

Furthermore, in recent years, an excimer leaser annealing (in this case, laser processing is based on heating) technology which polycrystallizes an amorphous film in particular has been utilized, as a machining technology using a pulsed laser beam, in a technology of realizing high performance of a thin film transistor which is used in a drive element such as a liquid crystal display.

In order to realize high performance of the thin film transistor, a crystallized silicon thin film having a large grain diameter must be formed. It is known that, when a thin film transistor is formed in a crystal grain, a mobility of the transistor is improved ten times or more.

As a method of forming a crystal grain having a large grain diameter in an amorphous semiconductor thin film, there is a method described in "Journal of The Surface Science Society of Japan, Masakiyo Matsumura, Vol. 21, No. 5, pp. 278-287, 2000".

In any application, microfabrication of micron order is required. If there is a failure of laser oscillation in one execution of laser irradiation due to any factor, there occurs a problem of a machining defect if nothing is fed back to a laser device. Specifically, when laser irradiation is not carried out or a light intensity of laser irradiation is lower than a set value, a region which is not machined well is generated, resulting in a reduction in a fair quality ratio (a yield ratio) of a final product.

Further, in crystallization based on laser annealing for other pulsed laser processing applications, if there is a part which has not been irradiated with a laser beam or a part in which an irradiation light intensity of a laser beam has not been enough, this part is not crystallized at all, or crystallization or activation becomes insufficient. Therefore, intended uniformity of characteristics or electrical characteristics cannot be obtained, which is a serious problem.

Furthermore, in a case where a laser processing method is used in a field using a laser processing method except the semiconductor field, e.g., machining of an ink discharge hole part of an inkjet head in an inkjet printer, if a laser beam is not applied to a given part or an irradiation light intensity of a laser beam is insufficient, a hole is not opened or hole machining becomes insufficient, and a yield ratio is likewise reduced in this field, resulting in a serious problem.

Usually, in the excimer laser, ultraviolet radiation has high machining properties and ultraviolet radiation demonstrates excellent absorption characteristics with respect to an amorphous semiconductor film in crystallization, and hence the excimer laser is suitable for crystallization. However, the excimer laser has instability in oscillation characteristics. As a result of actually executing a crystallization process by continuously and extensively applying a pulsed laser beam, the excimer laser device has the following drawbacks. Specifically, even though a trigger signal is externally input, no oscillation occurs, or a light intensity is extremely weak (e.g., not greater than ½ of a set value). In crystallization, even though a trigger signal for light emission control is input to the excimer laser device from the outside, a case of no oscillation is generated every 1000 pulses and the like. Alternatively, even though the same trigger signal is supplied, a light intensity is extremely weak, and it is not greater than a set value in some cases. That is because the excimer laser performs pulsed oscillation by a system based on high-voltage discharge in a gas. This is characteristics of a current element called "thyratron" used in the excimer laser, which is unavoidable at the present day. Although an excimer laser which does not use thyratron has been developed, a large load is imposed on a power supply circuit, thereby reducing reliability or increasing a cost.

This problem is realized as great irregularities of a machining conformation in a machining process, which is interference of mass production.

A "light-unemitting shot" described herein means a shot by which machining becomes incomplete, and includes both a "case where laser light is not generated at all" and a "case where a light intensity is low or a light emission time is short".

As a method of judging whether a shot of a leaser beam is a light-unemitting shot, it is general to adopt a method which places an optical component which partially divaricates light for laser beam intensity monitoring between a laser beam source and a processing target material in order to monitor divergent light such as described in Patent Reference 1. If it is determined that an intensity of the monitored divergent light is not normal, processing which returns to a non-normal processing point and again applies a laser beam can be considered. In the processing method in the above-described reference, however, there are the following two problems. That is, firstly, since a position at which a laser beam intensity is monitored is not a processing target material surface, there is a problem that an accurate laser beam intensity on the processing target material surface cannot be grasped. Secondly, moving an X-Y stage to return to an abnormal processing point and again applying a laser beam has no problem in case of rough processing of several-ten μm, but there is a limit in a mechanical accuracy in microfabrication which requires a positional accuracy of a processing point which is approximately 0.1 to 1.0 μm, and hence there is a problem that uniform processing is impossible (this problem can be solved by improving the mechanical accuracy).

In view of the above-described problems, it is an object of the present invention to provide a laser processing method using a pulsed laser beam which again allows a light emitting operation on the scene even if a light-unemitting shot occurs in application of a pulsed laser beam by a laser beam source so that accurate machining is possible without a defect, and a laser processing apparatus using a pulsed laser beam.

Next, in case of forming a liquid crystal drive circuit which forms a large display screen of a liquid crystal display device in a crystallized region, there are the following problems. In a process of sequentially moving a pulsed laser beam to a predetermined irradiation position in a large display screen to thereafter apply the pulsed laser beam, when any problem exists in laser irradiation of one given shot (an abnormal shot), a serious problem occurs in crystallization of the irradiation position. For example, when laser irradiation is not performed or when a light intensity of laser irradiation is low, crystallization does not occur, or crystallization becomes insufficient. Therefore, when a transistor is formed in this region, transistor characteristics are considerably deteriorated, and a fair quality ratio (a yield ratio) of a final product is thereby lowered.

Further, besides the laser crystallization process, in activation of a semiconductor implanted layer based on laser annealing, when a laser beam is not applied or when an irradiation light intensity of a laser beam is low, this part is not activated at all, or activation becomes insufficient. Therefore, intended electrical characteristics cannot be obtained, which is a serious problem in quality management.

In view of the above-described problems, it is an object of the present invention to provide a crystallization method which detects an abnormal shot and again performs shooting to thereby improve a reduction in a yield ratio of crystallization even if the abnormal shot occurs in irradiation of a laser beam for crystallization, a laser crystallization apparatus and a display device.

BRIEF SUMMARY OF THE INVENTION

In view of the above-described problems, it is an object of the present invention to provide a phase shifter capable of homogenizing a crystallization size in an irradiation region, a manufacturing method of the phase shifter, and a laser annealing apparatus.

Thus, a processing method according to one aspect of the present invention which relatively moves an irradiation position obtained by a pulsed laser beam emitted from a laser beam source and a processing target body and sequentially irradiating a predetermined position of the processing target body with the pulsed laser beam to perform machining comprises: a step of monitoring a light intensity of light reflected by the processing target body in accordance with the pulsed laser beam emitted from the laser beam source; a step of irradiating the next irradiation position of the processing target body with the pulsed laser beam when the monitored light intensity is normal; a step of again irradiating a light intensity insufficient position of the processing target body when it is determined that the light intensity is insufficient as a result of the monitoring; and a step of storing the irradiation position based on the pulsed laser light as light intensity insufficient irradiation position information when the light intensity is insufficient.

According to the above-described method, the conventional drawbacks are eliminated, and it is possible to provide a processing target body having, e.g., an excellent yield ratio.

The step of monitoring the light intensity in accordance with the pulsed laser beam preferably determines that the light intensity is insufficient when the light intensity to be monitored is not greater than a preset light intensity.

According to the above-described method, the conventional drawbacks are eliminated, and it is possible to provide a processing target body having, e.g., an excellent yield ratio.

Light reflected by the processing target body is preferably the pulsed laser beam reflected by the processing target body or light obtained by reflecting light emitted from a probe light source different from the laser beam source by the processing target body.

The pulsed laser beam applied to the processing target body preferably has an intensity of the pulsed laser beam on a two-dimensional plane homogenized by a homogenizing optical system.

According to the above-described method, the conventional drawbacks are eliminated, and it is possible to provide a processing target body having, e.g., an excellent yield ratio.

The result of the monitoring is preferably displayed, recorded in a storage medium and/or output to a printer during processing.

According to the above-described method, the conventional drawbacks are eliminated, and a processing history is displayed in the apparatus, or remains in a laser processing apparatus, a storage medium and/or a printer output during processing, and hence analysis of a defect or a yield ratio can be facilitated, thereby providing an excellent processing target body.

A processing method according to another aspect of the present invention which relatively moves an irradiation position obtained by a pulsed laser beam emitted from a laser beam source and a processing target body and sequentially irradiates a predetermined position of the processing target body with the pulsed laser beam to thereby perform processing comprises: a step of optically monitoring a processing state of the irradiation position in accordance with the pulsed laser beam emitted from the laser beam source; a step of irradiating the next irradiation position of the processing target body with the pulsed laser beam when it is determined that processing is normal as a result of the monitoring; a step of again irradiating a non-normal processing position of the processing target body when it is determined that processing is not normal as a result of the monitoring; and a step of storing the irradiation position obtained by the pulsed laser beam in case of the abnormal processing as non-normal processing irradiation position information.

According to the above-described method, the conventional problems are eliminated, and it is possible to provide a processing target body having, e.g., an excellent yield ratio.

A processing apparatus using a pulsed laser beam according to still another aspect of the present invention comprises: a laser beam source which emits a pulsed laser beam; a homogenizer optical system which homogenizes an intensity of a laser beam oscillated by this laser beam source in a two-dimensional plane; monitoring means for monitoring an intensity of light reflected by the processing target body; means for irradiating the next irradiation position of the processing target body with the pulsed laser beam when it is determined that the light intensity is normal as a result of monitoring by the monitoring means; and means for again irradiating a light intensity insufficient position of the processing target body when it is determined that the light intensity is insufficient as a result of the monitoring.

A processing apparatus using a pulsed laser beam according to yet another aspect of the present invention comprises: a laser beam source which emits a pulsed laser beam; a homogenizer optical system which homogenizes an intensity of the laser beam emitted from this laser beam source in a two-dimensional plane; processing means for irradiating a processing target body with the homogenized laser beam to perform laser processing with respect to this processing target body; an optical monitoring portion which optically monitors a processing state of an irradiation position in accordance with the pulsed laser beam emitted from the laser beam source; first irradiating means for irradiating the next irradiation position of the processing target body with the pulsed laser beam when it is determined that processing is normal as a result of the monitoring; and second irradiating means for again irradiating a non-normal processing position of the processing target body when it is determined that processing is not normal as a result of the monitoring.

According to the above-described method, the conventional drawbacks are eliminated, and it is possible to provide a processing target body having, e.g., an excellent yield ratio.

A crystallization method according to one aspect of the present invention which irradiates a non-single-crystal semiconductor film with a laser beam emitted from a laser beam source which performs pulsed oscillation to thereby carry out crystallization has: a homogenization processing step of homogenizing an intensity of the laser beam in a two-dimensional space; a step of forming a light intensity gradient in an intensity distribution of the laser beam subjected to the homogenization processing; a laser beam irradiation step of irradiating the non-single-crystal semiconductor film with the laser beam having the light intensity gradient formed therein; a laser beam detection step of detecting whether the laser beam is a laser beam having a predetermined specified value; an abnormal shot position information storage step of storing an irradiation position of the non-single-crystal semiconductor film as abnormal shot position information when the detected value does not fall within a range of the specified value; and a laser beam re-irradiation step of reading the stored abnormal shot position information and irradiating a position corresponding to the read abnormal shot position information with the laser beam.

According to the above-described method, the conventional drawbacks are eliminated, and it is possible to provide a non-single-crystal semiconductor film having, e.g., an excellent yield ratio.

The laser beam detection step preferably comprises: a step of dividing the laser beam into a crystallization laser beam and an abnormal shot detection laser beam by an optical component provided between the laser beam source and the non-single-crystal semiconductor film; and a step of detecting the abnormal shot laser beam, comparing the detected laser beam with a predetermined specified value, and outputting the abnormal shot laser beam as an abnormal shot when the abnormal shot laser beam which is not greater than this specified value is detected.

The laser beam detection step is preferably a step of detecting a change in the non-single-crystal semiconductor film by reflected light in association with an irradiation timing of the laser beam.

The specifies value is preferably a laser intensity of an energy quantity with which the non-single-crystal semiconductor film is melted.

The laser beam detection step is preferably a step of using an instrument to measure an irradiation part of the non-single-crystal semiconductor film irradiated with the laser beam.

The specified value is preferably equal to a specified value used in crystallization by previous irradiation.

The laser beam re-irradiation step is preferably a step of reading abnormal shot position information by the laser beam irradiation step when, the laser beam irradiation step with respect to all predetermined irradiation positions of the non-single-crystal semiconductor film is completed, and again applying the laser beam.

At least one of the irradiation position information and the abnormal shot position information obtained by the laser beam irradiation step is preferably displayed in a display device.

A laser crystallization apparatus which irradiates a non-single-crystal semiconductor film with a laser beam emitted from a laser which performs pulsed oscillation to thereby carry out crystallization has: laser beam detecting means for detecting whether the laser beam is a laser beam having a predetermined specified value; and a computer which compares a detected value detected by this laser beam detecting means with a previously stored specified value, stores irradiation position information of the non-single-crystal semiconductor film as abnormal shot position information when the detected value does not fall within a range of the specified value, and reads the abnormal shot position information to again issue a laser beam irradiation command after another light receiving region is irradiated with the laser beam and laser beam irradiation of the non-single-crystal semiconductor film is terminated.

A laser crystallization apparatus which irradiates a non-single-crystal semiconductor film with a laser beam emitted from a laser which performs pulsed oscillation to carry out crystallization has: a laser beam source which performs pulsed oscillation with respect to a laser beam; a homogenizer optical system which is provided in a laser optical path from this laser beam source and performs homogenization processing with respect to an intensity of this laser beam in a two-dimensional space; an optical element which is provided in a laser optical path from this homogenizer optical system and forms a light intensity gradient in the homogenized laser beam; a sample stage which is provided in a laser optical path from this optical element, on which a non-single-crystal semiconductor film whose light receiving region is at least partially melted when the laser beam is received is mounted, and which can move to another predetermined light receiving region; laser beam detecting means for detecting whether the laser beam is a laser beam having a predetermined specified value; and a computer which compares a detection value detected by this laser beam detecting means with a previously stored specified value, stores irradiation position information of the non-single-crystal semiconductor film as abnormal shot position information when the detected value does not fall within a range of the specified value, and reads the abnormal shot position information to again issue a laser beam irradiation command after another light receiving region is irradiated with the laser beam and laser beam irradiation of the non-single-crystal semiconductor film is terminated.

A region corresponding to each predetermined pixel of a non-single-crystal semiconductor film provided on a substrate is irradiated with a crystallization laser beam by the laser crystallization method mentioned above to form a crystallized region, and a transistor is formed in this crystallized region.

According to the above-described method, the conventional drawbacks are eliminated, and it is possible to provide a non-single-crystal semiconductor film having, e.g., a yield ratio.

According to the present invention, it is possible to obtain a laser processing method using a pulsed laser beam and a laser processing apparatus using a pulsed laser beam, which again allow a light emitting operation on the moment even if a light-unemitting shot occurs in application of the pulsed laser beam by a laser beam source, thereby effecting accurate processing without a defect.

Furthermore, according to the present invention, it is possible to excellently perform laser crystallization without lowering a yield ratio since an abnormal shot is detected to thereafter perform repairing even if the abnormal shot occurs in application of a laser beam for crystallization.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1D is a view showing a processing state of a processing target body;

FIG. 9 is a system block diagram illustrating a laser processing apparatus according to a second embodiment of the present invention;

FIGS. 13A to 13F are system block diagrams illustrating embodiments of a laser crystallization apparatus according to the present invention;

FIG. 21 is a view illustrating a relationship between the FIG. 13A optical system and a crystallization target substrate;

DETAILED DESCRIPTION OF THE INVENTION

An object of an embodiment according to the present invention will now be described with reference to FIG. 1A to 1D. First, a description will be given on a judging experiment which is a criterion of judging whether a state in this excimer laser processing apparatus is good or bad, i.e., whether an irradiation light intensity of a laser beam is normal or abnormal. A laser beam from a beam source was homogenized by a homogenizer or the like, and it was shaped into a beam 31 which is rectangular in a two-dimensional plane shown in FIG. 1A and has a homogeneous laser light intensity. At this time, FIG. 1B shows a one-dimensional light intensity distribution in a direction indicated by a line 32, and FIG. 1C shows a one-dimensional light intensity distribution in a direction indicated by a line 33. A processing target body 47, e.g., a resin substrate (a polyimide substrate in this case) such as a plastic substrate or a polyimide substrate was irradiated with such a beam 31 with a fixed laser beam intensity, e.g., a laser beam intensity of 700 mJ/cm$^2$ to perform ablation processing.

Figure 1A:
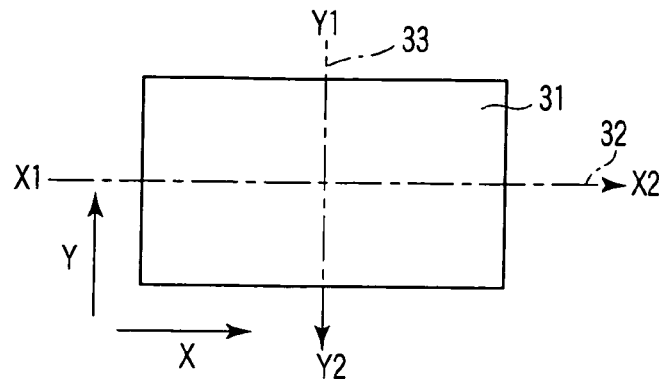
FIGS. 1A to 1D are views each showing a laser intensity distribution for explaining an embodiment of the present invention.
Figure 1B:
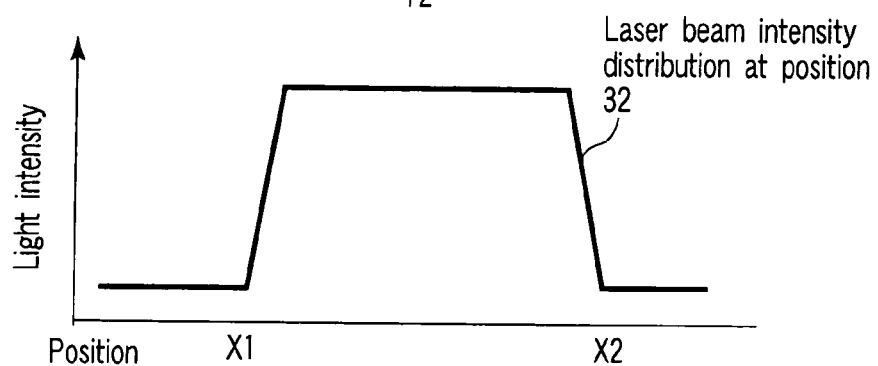
Figure 1C:
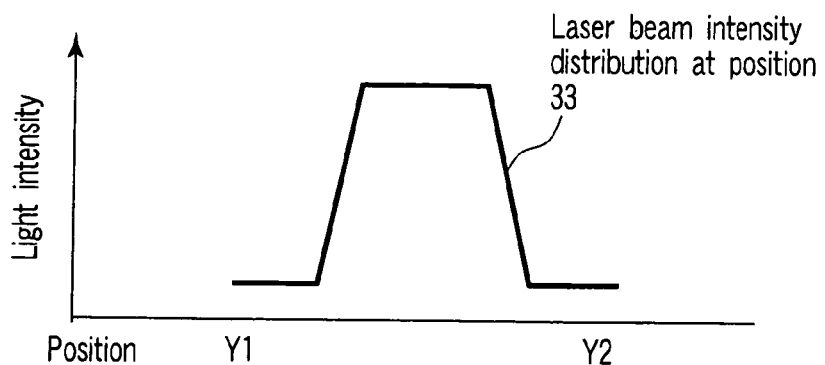
Figure 1D:
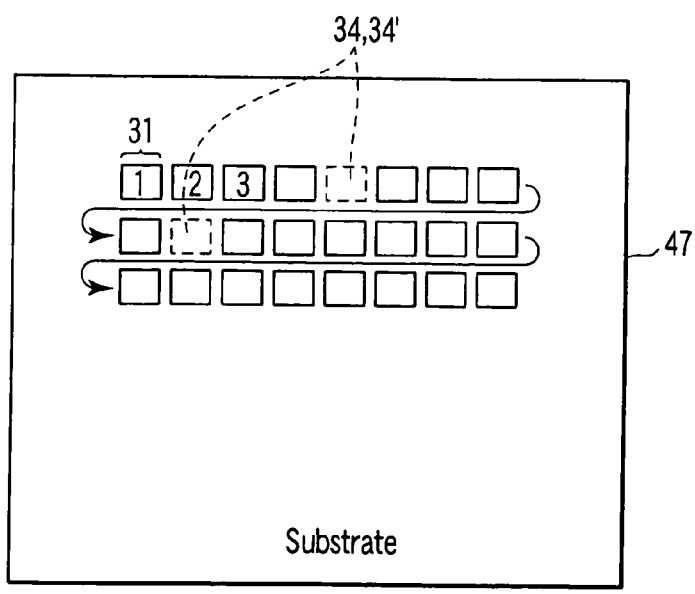

On the processing target body 47, as shown in FIG. 1D, irradiation of one shot was carried out from an upper left position with the substrate and the beam 31 being relatively moved in a row direction. Upon termination of one-shot irradiation in one row, an irradiation spot was moved in a column direction to a position which is not superimposed on the already irradiated region and then moved toward the next row so that an irradiation position can be sequentially shifted to "1", "2", . . . in the row direction in accordance with each shot, and irradiation was carried out at fixed intervals. Further, when the irradiation position reached a right end in the second row, it was moved to a left end in the next third row below the second row, and irradiation was again likewise performed to the right end. In this manner, irradiation was carried out with the same intensity at fixed intervals while being associated with a stage X, Y. FIG. 1D shows this state. With this irradiation, a light intensity of each pulsed oscillation output from the laser apparatus was recorded as a processing history in a memory in association with an irradiation position of the laser shot.

Here, examining the processing target body 47 irradiated in the above-described process, it was revealed that there exists a shot by which ablation does not occur at all at each irradiation position indicated by 34 in FIG. 1D. Checking a record of an oscillation intensity of the laser apparatus at such a shot position, it was understood that the oscillation intensity of the excimer laser is extremely small. As a result of the extensive examination, it was revealed that no occurrence of ablation at each irradiation position denoted by 34 was caused by a light-unemitting shot.

The present inventors discovered that such a light-unemitting shot is results in insufficiency of a light intensity for processing so that processing based on ablation processing cannot be performed or non-normal processing such as occurrence of a part where an ablation area is small or ablation is insufficient is generated in some cases.

In order to avoid such non-normal processing, the following processing apparatus using a pulsed laser or a processing method using a pulsed laser can obtain a laser processing target surface which can be accurately processed without a defect allover. Further, a processing target body having an excellent yield ratio can be obtained and, specifically, using such an apparatus or method in an ablation processing step can reduce or eliminate a part which is not ablated or a part where ablation is insufficient, thereby improving a yield ratio.

FIRST EMBODIMENT

Figure 2:
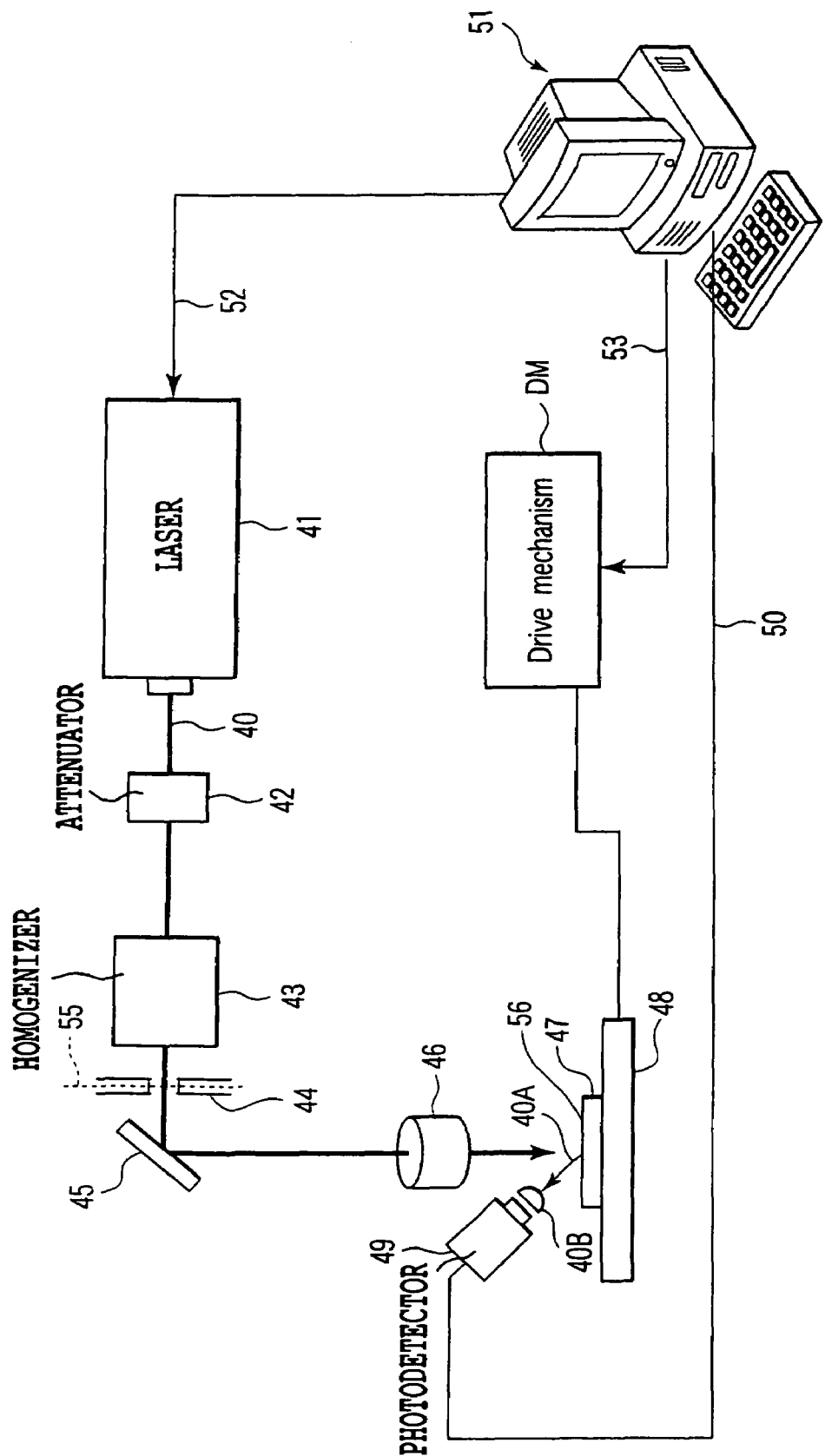
FIG. 2 is a system block diagram illustrating a laser processing apparatus according to a first embodiment of the present invention.

A laser processing apparatus using a pulsed laser beam and a laser processing method using a pulsed laser beam will now be described with reference to FIG. 2. FIG. 2 is a system block diagram showing a laser processing apparatus using a pulsed laser beam. In these examples, an excimer laser beam source 41 (e.g., XeCl, KrF, ArF or the like) having a large output is used as a pulsed laser beam source, but the present invention is not restricted thereto, and a solid laser such as a third harmonic wave or fourth harmonic wave of Q switched YAG laser may be used.

As shown in FIG. 2, an attenuator 42 which controls a light intensity of a pulsed laser beam 40 and a homogenizing optical system 43 which homogenizes an intensity of a laser beam on a two-dimensional plane are sequentially arranged in an exit optical path of the excimer laser beam source 41 which emits the pulsed laser beam 40.

It is to be noted that a position denoted by reference numeral 55 corresponds to a primary image forming plane (a focal plane) of the homogenizing optical system 43, and an optical element 44 which shapes an intensity distribution of a laser beam homogenized by the homogenizing optical system is arranged at this position. The optical element 44 is an optical component having a function of shaping a light intensity distribution, and it is possible to use a metal mask having a rectangular opening portion or an optical mask using as a base material quartz or the like obtained by depositing a non-translucent material on a translucent optical component of quartz or the like and removing the non-translucent material in a rectangular shape by etching. Moreover, it is also possible to use a phase modulation element or an optical diffraction element having an irregular shape obtained by performing etching or film deposition on a surface of a base material such as quartz.

A mirror 45 which reflects the pulsed laser beam 40 90 degrees is provided in the exit side optical path of the homogenizing optical system 43. The pulsed laser beam 40 reflected by this mirror 45 is transmitted through a projection lens 46, and again image-formed on a surface of a substrate which is a processing target body 47 provided at a focal position of this projection lens 46 (a secondary image forming plane 56). As a result, the processing target body 47 mounted on an X-Y stage 48 is processed.

On the other hand, a part 40A of the pulsed laser beam 40 reflected by the processing target body 47 is condensed by a lens 40B, and received by a photodetector 49 which detects a light intensity. Here, in regard to reflection, reflected light which is reflected 180 degrees has the highest intensity, but the pulsed laser beam to be applied has a high intensity, and reflected light is also generated at any other angle depending on a surface state or a structure of the processing target body 47. Therefore, this reflected light includes information of a processing state of the processing target body 47.

A received light signal intensity is input to a computer 51 through a signal line 50, the computer performing analysis of a light intensity detection signal and control for allowing a crystallization apparatus to automatically execute a process.

The computer 51 judges an analysis result of the light intensity detection signal, and the computer 51 transmits a movement signal to a drive mechanism DM through a signal line 53 in order to control the stage 48 to move, or transmits an oscillation control signal to the laser beam source 41 through a signal line 52 depending on a result of this judgment. If the computer 51 determines that the light intensity is a normal intensity which is not smaller than a specified value as a result of the judgment, the laser beam 40 and the processing target body 47 are relatively moved to the next irradiation position by movement control.

When the laser beam irradiation position is set to the next processing target position, the computer 51 performs oscillation control with respect to the laser beam source 41. On the other hand, if the computer 51 determines that the light intensity is insufficient as a result of the judgment, the computer 51 again performs oscillation control with respect to the laser beam source 41 with a relative position of the laser beam 40 and the processing target body 47 being set in a suspended state.

The photodetector 49 which is characteristic of the apparatus according to this embodiment will now be described in detail. Here, the lens 40B which condenses the reflected light 40A on the photodetector 49 is one of methods which lead light to the photodetector 49, and it may be a convex lens or a cylindrical lens. Further, a light reducer may be inserted or a wavelength filter may be inserted between the processing target body 47 and the photodetector 49 in order to control a detection sensitivity.

As the photodetector, a power meter which is manufactured by OPHIR Ltd., and has a model number PE50BB is used. However, the photodetector 49 is not restricted to this model, and any photodetector having a sufficient optical sensitivity and a dynamic range can suffice. Furthermore, it is possible to use a photodetector which does not have an optical sensitivity with respect to an excimer laser beam but has a detection sensitivity in a regular visible light region, and can detect an excimer laser beam as visible light by using on a front surface of the photodetector 49 a filter which converts an ultraviolet ray into visible light or a wavelength conversion plate on which a fluorescent material is applied, the fluorescent material producing fluorescent in a visible light region on a wavelength side longer than an excimer laser wavelength by ultraviolet irradiation.

Figure 3:
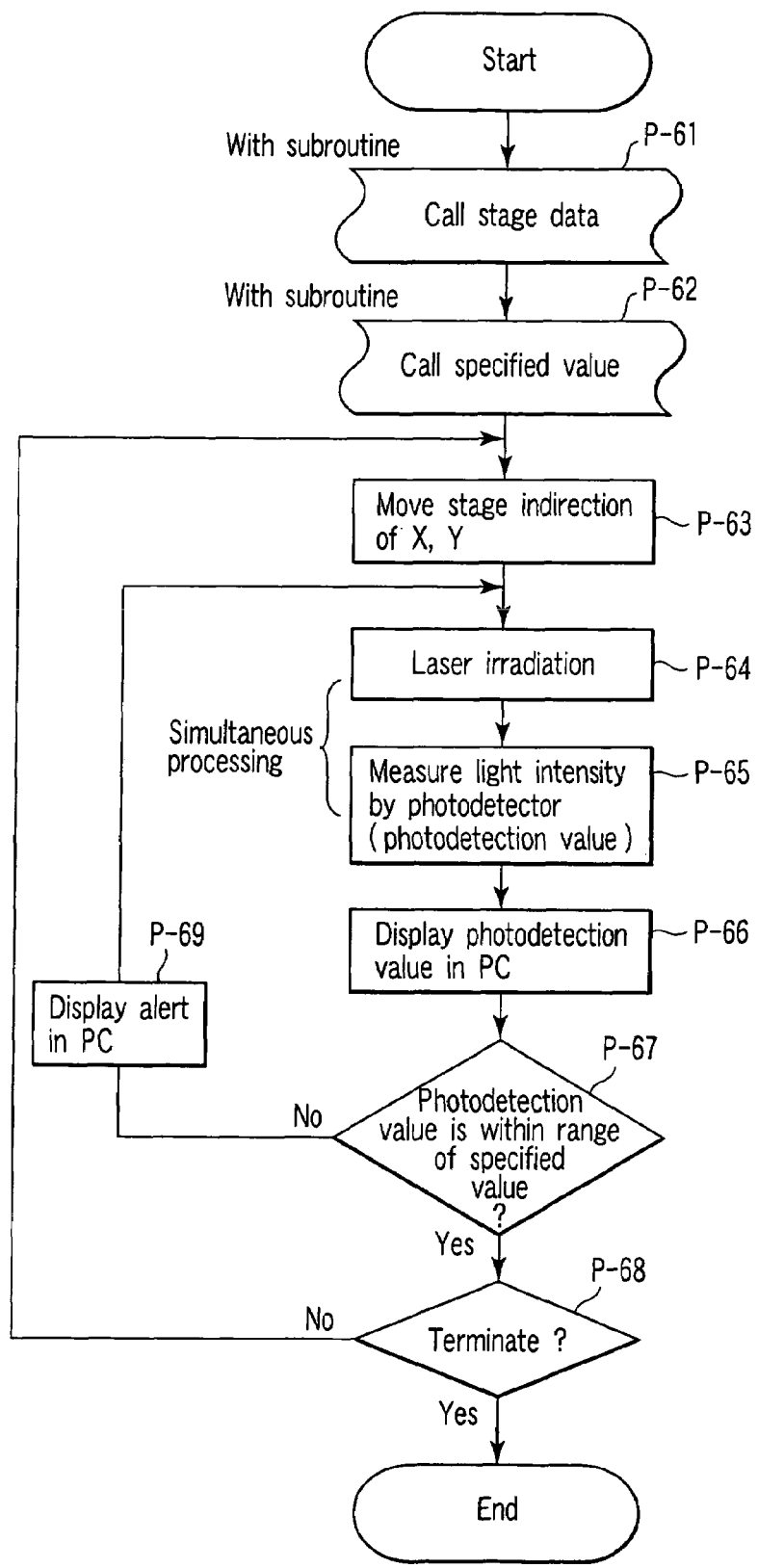
FIG. 3 is a flowchart illustrating a method according to the embodiment in a process order.

A light intensity value detected by the photodetector 49 is input to the computer 51. The computer 51 compares the input value with a specified value which is a light intensity required to perform ablation with respect to the predetermined processing target body 47, and controls predetermined processing depending on the input value which is not smaller or greater than the specified value. FIG. 3 shows its process flowchart, and a description will now be given with reference to the flowchart of FIG. 3. Like reference numerals denote parts equal to those in FIGS. 1 and 2, and their tautological explanation will be eliminated.

First, the computer 51 carries out a process 61 (P-61) which calls, as control data for the stage 48, processing information of a substrate which is the processing target body 47 to be processed, e.g., irradiation position information like coordinate information of x-y such as shown in FIG. 1D. Then, it performs a process 62 (P-62) which calls the specified value which is a predetermined normal irradiation value. Such calling processes are carried out through a sub-routine. Data of the specified value is previously stored in a storage device (a storage medium such as a floppy disk, a silicon memory, a hard disk (HD), a magneto optical disk (MO) a compact disk (CD), a DVD and others) provided in the computer 51. The calling processes read data from this storage device.

Then, the computer 51 executes a process 63 (P-63) which moves the stage 48 to a coordinate position of X and Y specified by a predetermined program so that the processing target body 47 is set at a position where it is irradiated with the laser beam.

Subsequently, the computer 51 performs oscillation control over the laser beam source 41 to effect a first laser irradiation process 64 (P-64). At the same time, it executes a process 65 (P-65) which measures a laser light intensity by using the photodetector 49, and carries out a process 66 (P-66) which transmits a detected value (a photodetection value) to the computer 51 through a signal line 50 and then displays this value.

Further, a judgment is made upon whether the photodetection value detected by the photodetector 49 falls within a range of the specified value (P-67). In the judgment of a process 67 (P-67), the photodetection value detected by the photodetector 49 is compared with the specified value, and the computer 51 performs a process 68 (P-68) which judges end of the program (P-68) if the compared photodetection value falls within the range of the specified value (normal irradiation). If it is determined that the machining process has not been terminated yet as a result of the judgment based on the process 68 (P-68), a machining process of the next irradiation position is executed. That is, a command signal to move the stage 48 is transmitted in order to carry out an irradiation process for the next irradiation position so that the processing target body 47 can be set to a position where it should be irradiated with the laser beam, and the drive device DM moves the stage 48 in response to this command, thereby continuing the processing.

On the other hand, if the detected photodetection value does not fall within the range of the specified value (non-normal irradiation), namely, when laser irradiation is not carried out or when the laser light intensity is smaller than the specified value, the computer 51 again performs the next control over the laser beam source 41 on the moment in order to apply the laser beam. The computer 51 does not transmit a command signal for moving the stage 48 to the drive device DM, but carries out a process 69 (P-69) of alert display by which laser irradiation is again performed, and then again effects the process 64 (P-64) of pulsed laser irradiation without moving the processing target body 47. At this time, the photodetector 49 likewise detects a light intensity of a pulsed laser beam, and judges whether irradiation is normal or non-normal.

The computer 51 compares a detected light intensity value with the specified value to make a judgment, and transmits a command signal for moving the stage 48 to the drive device DM for the next process if the detected value falls within the range of the specified value. This drive device DM operates the stage 48 in response to this command to move the processing target body 47 to the next processing position. After conforming movement of the processing target body 47, the computer 51 performs oscillation control over the laser beam source 41 to generate the laser beam 40, thereby continuing the ablation processing.

Here, if light-unemitting shots are continuously generated or the number of light-unemitting shots is larger than that in regular processing, it can be considered that any problem exists in laser oscillation, an optical component and others, and hence the computer 51 may display an alert to inform an operator, or a function of transmitting an alert signal may be provided to the computer 51 managing an apparatus operating status. As to alert display, a probability that a detected light intensity value with respect to the number of times of oscillation control of the laser beam source 41 does not fall within the range of the specified value may be calculated, and the calculated probability may be always displayed.

Furthermore, if an irradiation light intensity of the pulsed laser beam does not fall within the range of the specified value, the processing position information is stored in the storage device in the computer 51. Storage of this processing position information is effective when performing reconfirmation in an inspection process after the processing.

When machining was carried out with respect to all parts of the processing target body 47 which should be processed, an end judgment is made, and the processing of the substrate which is the processing target body 47 is terminated. In this case, in order to preserve a processing status and a processing history with respect to the processing target body 47, the specified value used when processing the processing target body 47 and the photodetection value of the photodetector are saved as data in the storage device (a storage medium such as a floppy disk, a silicon memory, a hard disk, a magneto optical disk (MO), a compact disk (CD, a DVD and others), the data is output to a printer or the like, then the processing target body 47 is collected, and the next processing target body 47 is mounted on the stage 48, thereby continuing the same processing.

Here, the predetermined specified value is a value obtained in advance by an experiment, a value given by an approximate calculation formula based on an experimental value, or a previous processing value. The specified value is affected by manufacturing conditions (a composition or the like) of the intended processing target body 47. It can be considered that the manufacturing conditions have an influence on the specified value because a laser ablation phenomenon greatly concerns a photochemical reaction of the processing target body 47 and its status is affected by a coupling state of constituent elements.

Moreover, values such as daily environmental variables (a temperature, humidity and others), an individual difference of the excimer laser beam source 41, a frequency in use, a deterioration status, an individual difference of a reflection factor (reflective index) or a transmission factor of each optical component and others are also reflected in this specified value, and a different value is set in accordance with each processing apparatus. Additionally, this specified value changes from day to day (since environmental variables, a frequency in use, a deterioration status are concerned), and hence a processing status of the processing target body 47 which has been already processed is fed back. Actually, a monitoring standard substrate is prepared, an ablation status of the processing target body 47 is confirmed by periodically performing a step evaluation (a contact type step instrument, a laser microscope, an optical microscope, an interference microscope) and an evaluation experiment of an ablation status (a change in optical reflectance before and after processing) or the like, and the confirmed status is reflected in the specified value.

Figure 4:
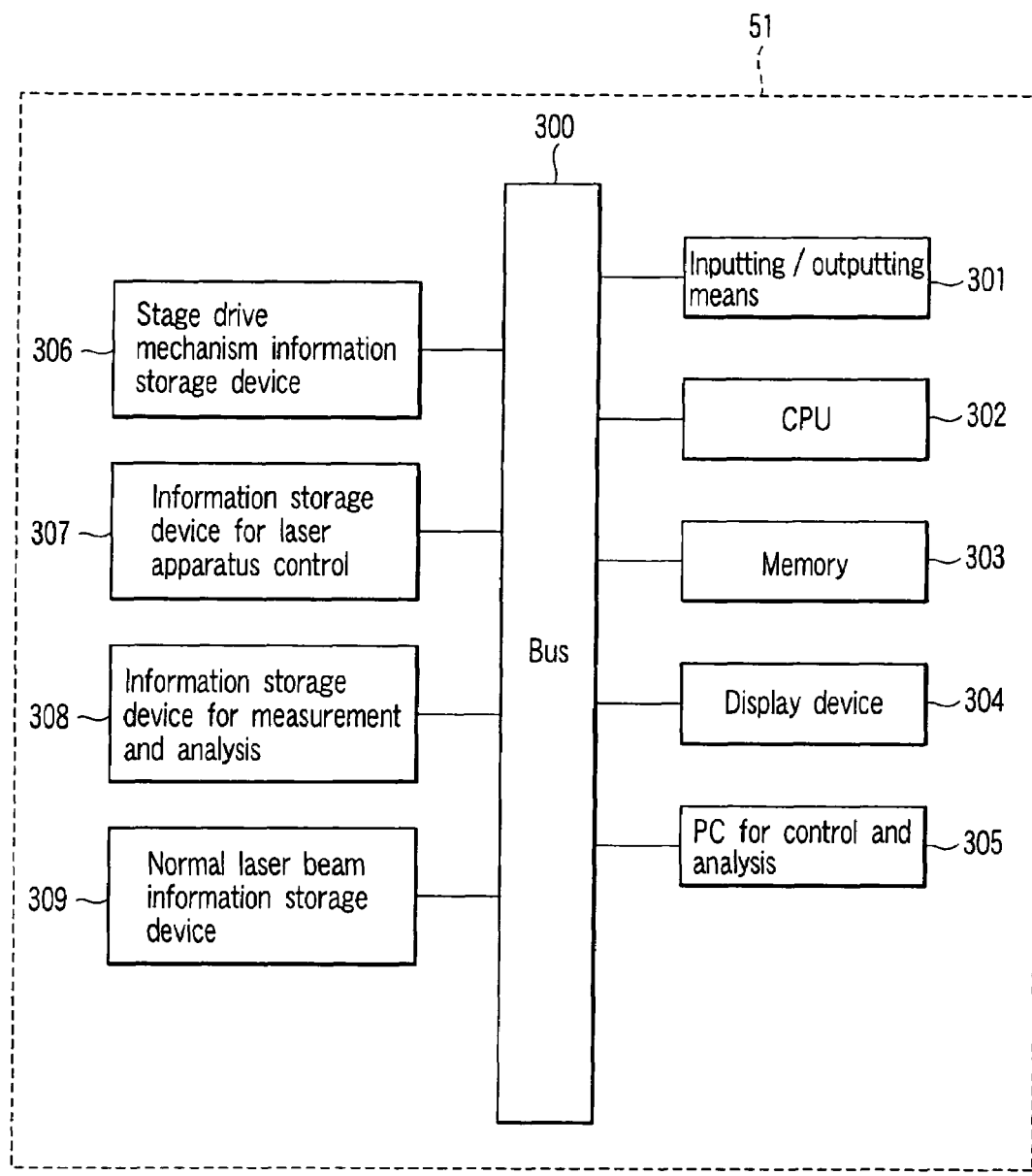
FIG. 4 is a system block diagram illustrating a configuration of a computer depicted in FIG. 2.

A control system of the ablation process performed by the FIG. 2 computer 51 will now be described with reference to FIG. 4. FIG. 4 is a system block diagram showing the computer 51. Like reference numerals denote parts equal to those in FIG. 2, thereby eliminating their detailed explanation.

To a bus line 300 are connected inputting/outputting means 301, a central processing unit (which will be referred to as a CPU hereinafter) 302 which executes a crystallization process based on a previously stored operation program, a memory 303 which stores a predetermined operation program, and a display device 304 which displays input/output information.

Further, to the bus line 300 are also connected a control/analysis computing machine (PC) 305 which outputs a controls signal used to perform ablation processing, a stage drive mechanism information storage device 306 which stores a program which is used to automatically move the stage on which a processing target substrate is mounted with a predetermined process, and a laser device control information storage device 307 which stores a program for controlling the pulsed laser beam source 41 which outputs a pulsed laser beam for ablation processing.

Furthermore, to the bus line 300 is connected a measurement/analysis information storage device 308 which stores a program which measures a light intensity of each pulsed laser beam emitted from the pulsed laser beam source 41 and judges whether the pulsed laser beam is applied to the next irradiation position or the pulsed laser beam is again emitted based on the measured value. Moreover, a normal laser beam information storage device 309 which stores a previously obtained light intensity required to perform ablation processing as normal light intensity information is connected to the bus line 300.

An embodiment of an ablation processing step will now be described with reference to FIGS. 2 and 4. First, before executing the ablation processing step, the CPU 302 reads the program stored in the memory 303 to move the processing target body 47 from an optical path of the laser beam 40 or the stage 48 which supports this processing target body 47 to a predetermined retraction position, and performs positioning of the processing target body 47. Then, the CPU 302 reads an ablation processing program from the memory 303, and controls emission of the pulsed laser beam set to a light intensity for the ablation processing from the laser beam source 41.

The emitted laser beam is applied to the processing target body 47 through the optical system, and a part of the laser beam reflected from the processing target body 47 is detected by the photodetector 49. The CPU 302 stores light intensity information detected by this photodetector 49 in the memory 303 through the inputting/outputting means 301. The CPU 302 reads normal light intensity information previously obtained for crystallization from the normal laser beam information storage device 309 based on a program read from the measurement/analysis information storage device 308, compares this information with the detected light intensity information, outputs judgment information indicating whether the light intensity falls within a range of a normal intensity, and stores it in the memory 303 in association with irradiation position information.

If it is determined that the light intensity falls within the range of the normal intensity, the CPU 302 displays this result in the display device 304, and stores it in the normal laser beam information storage device 309. At the same time, the CPU 302 reads a program required to move the stage 48 from the stage drive mechanism information storage device 306, and outputs control information used to move the stage 48 to the next irradiation position to the drive mechanism DM.

On the other hand, if it is determined that the light intensity does not fall within the range of the normal intensity, the CPU 302 decides that this judgment information is indicative of an output defect, displays this result in the display device, and stores it in the measurement/analysis information storage device 308. At the same time, the CPU 302 reads a laser device control program from the laser device control information storage device 307, and controls the laser beam source 41 so that emission of the laser beam is again controlled.

At this time, the CPU 302 drives the stage 48 to stop so that reapplication control is performed, or a reapplication operation can be executed in the next laser beam emission period. Such a processing step is repeated to extensively execute the ablation processing step.

Figure 5:
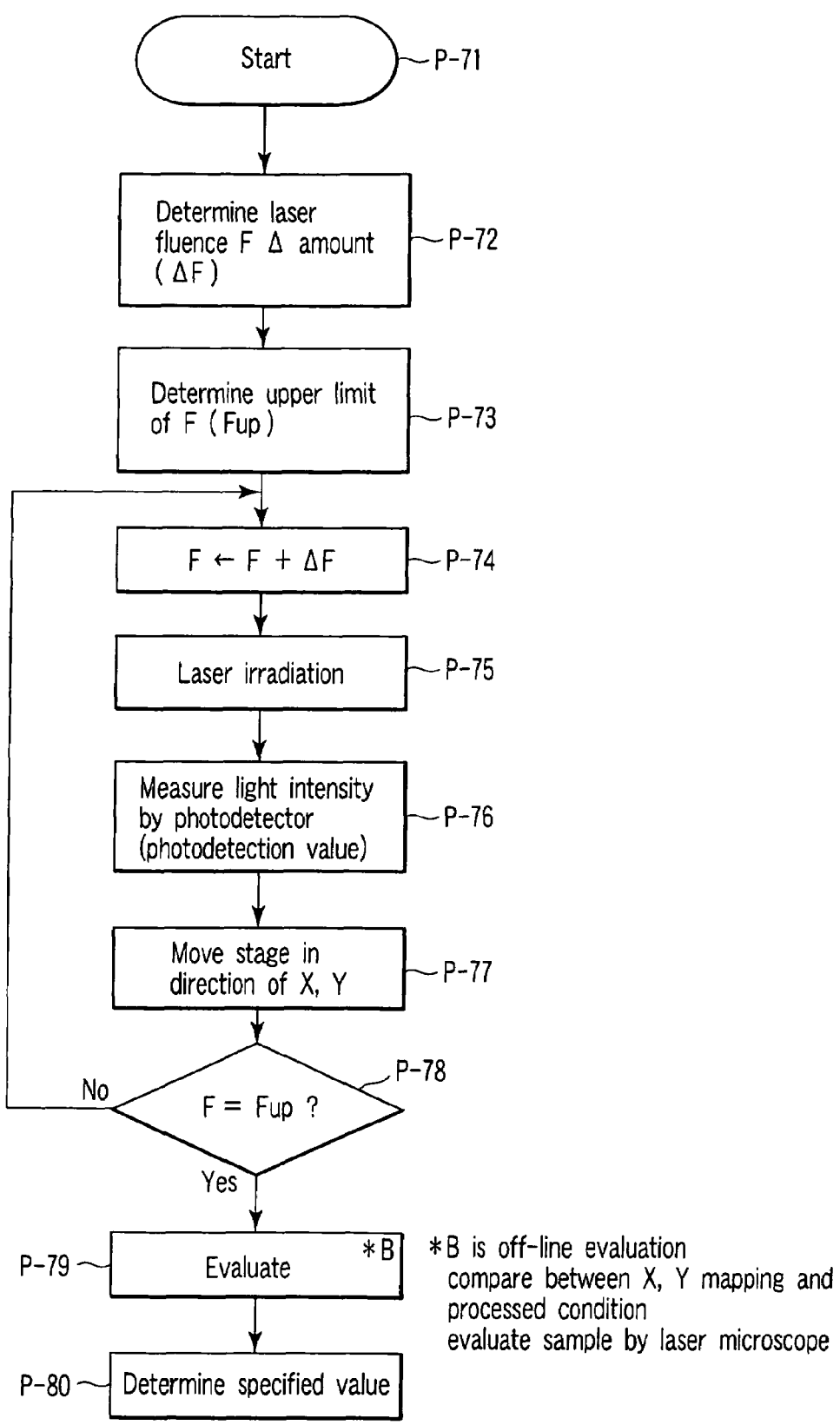
FIG. 5 is a flowchart illustrating a method of determining a specified value of the embodiment in a process order.

A procedure of determining a specified value in an example of the ablation processing will now be described with reference to FIG. 5 as a flowchart. Like reference numerals denote parts equal to those in FIGS. 1 to 3. The specified value is determined by irradiating the processing target body 47 with the laser beam from the laser beam source 41 while sequentially increasing a laser beam intensity F (a laser fluence F) and actually measuring a threshold value as the specified value with which processing can be sufficiently performed. In this case, the ablation processing is carried out by laser irradiation so that a depressed part (a depth) is formed on the processing target body.

First, the above-described increasing quantity (ΔF) of the laser beam intensity is determined (P-72). It is desired that this value is much greater than a scattering value between shots of the laser beam source 41. Then, an upper limit value (Fup) of the laser beam intensity required for laser processing for machining is determined (P-73). This upper limit value of the laser beam intensity is determined while considering an oscillation capability of the laser beam source 41, e.g., an excimer laser beam source, an appropriate range at the time of continuous processing, a processing margin and others. The processing target body 47 is irradiated with a laser beam intensity to which the increasing quantity ΔF is sequentially added (P-74, P-75), a light intensity is measured by the photodetector 49, and an output value is stored (P-76). The stage 48 is sequentially moved (P-77), and machining (processing) is continued. When the laser beam intensity has reached the upper limit value Fup (P-78), machining (processing) is aborted. The processing target body 47 was taken out, and evaluation was carried out in the next step (P-79). This is an off-line evaluation, and a processed state was evaluated by using a laser microscope this time.

Figure 6:
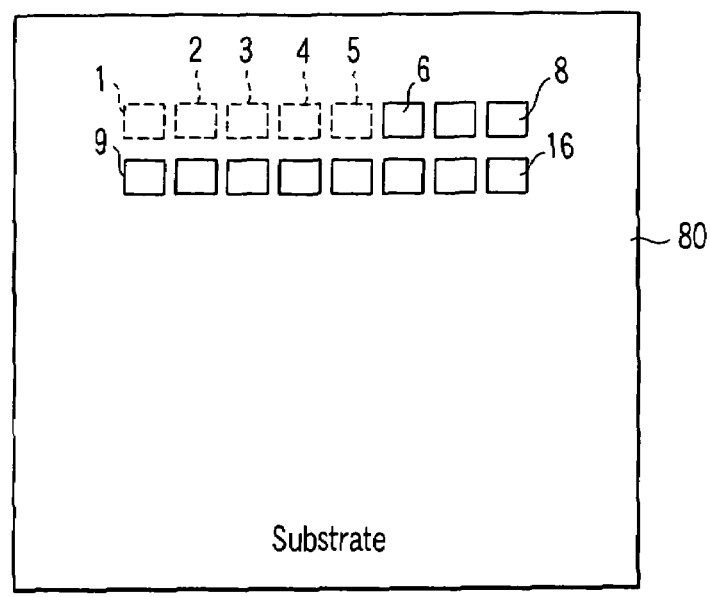
FIG. 6 is a plan view showing a processing state of a processing target body for explaining a process of determining a specified value of by the laser processing apparatus depicted in FIG. 2.

FIG. 6 shows a substrate which is the processed processing target body 47. Numeric FIGS. 1, 2, 3, 4 . . . indicate processing orders, and each rectangle indicates a processed region obtained by one laser irradiation. As the number is increased from 1, the laser beam intensity is increased ΔF to perform processing. No ablation processing was carried out in regions having the numbers 1 and 2, but a depth of the ablation processing is increased as the number grows from 3 to 5, and the depth became fixed in regions having the number 6 and the subsequent numbers. Therefore, the laser beam intensity when processing was carried out at the sixth time is a lower limit value required to perform sufficient processing. If the laser beam intensity is smaller than this lower limit value, the processing is insufficient, and hence a value of the photodetector 49 with this lower limit value is determined as the specified value (P-80). In this case, although the depth became fixed in the sixth and subsequent regions, the fixed depth is not necessary obtained depending on a processing material. In this case, when a given depth is reached, it is determined that sufficient processing has been carried out, and a value of the photodetector 49 with this lower limit value can be determined as the specified value.

Figure 7:
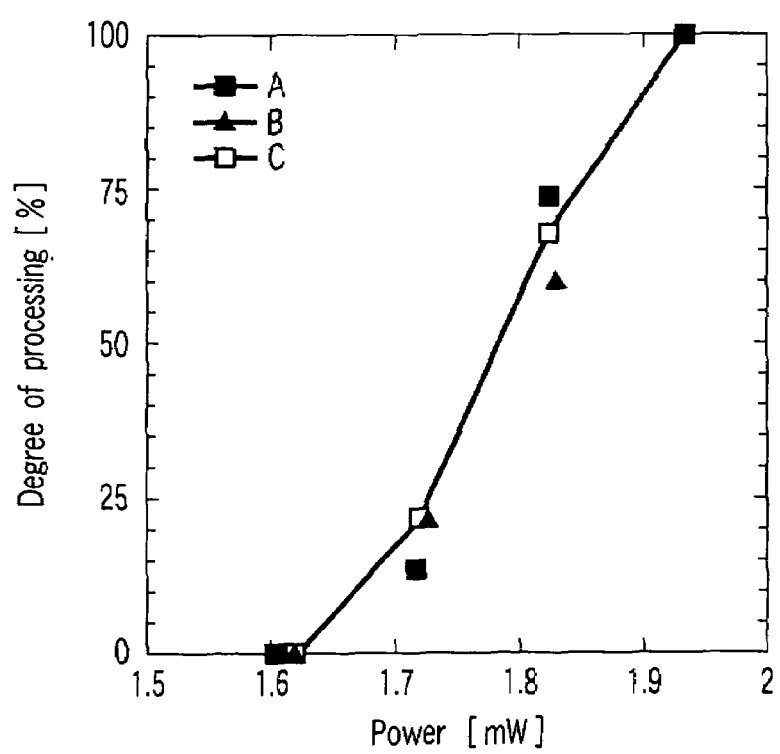
FIG. 7 is a characteristic view showing a relationship of a processing degree with a step shape of ablation processing being standardized with respect to a detection value of a photodetector by the laser processing apparatus depicted in FIG. 2.

FIG. 7 shows a concrete experimental result. In FIG. 7, a horizontal axis shows a value detected by the photodetector 49 in the laser processing apparatus used in this experiment. Since a fixed step can be obtained with an optimum value, a vertical axis shows a processing degree obtained by standardizing a step shape based on the ablation processing as a ratio of a processed step with respect to the fixed step. It was revealed that the processing degree increases in accordance with a measured value of the photodetector 49.

The processing target body 47 used in evaluation is the three same polyimide substrates (A, B and C), and the ablation processing experiment was conducted by using these three substrates. A laser processing apparatus which performs machining was used as an evaluation apparatus, and the processing target bodies 47 which are continuously processed in the same machining day were used to conduct the experiment in order to avoid an influence of environmental variables as much as possible. As a result, a region having a photodetection value which is not smaller than 1.9 mW obtained by the photodetector 49 has a value corresponding to a laser irradiation quantity required to obtain an excellent processed shape, and this value was determined as a specified value.

This experiment evaluates a processing conformation by using the laser microscope in order to obtain the specified value in the ablation processing and thereby determines the specified value of the photodetector, but the present invention is not restricted to this method, and there is, e.g., a method of evaluating a processed surface by using a stylus type step instrument. Moreover, as to determination of the specified value, a previous specified value may be stored and adopted as a current specified value.

Additionally, in the above-described evaluation experiment, since the evaluation takes time, it is difficult to immediately perform feedback in the current processing step.

If many of factors causing light-unemitting shots correspond to a case where oscillation of the laser does not occur even if a trigger signal is input, it is good enough to set a specified value to a current value obtained by a discharge current detection circuit in a power supply circuit of the laser beam source 41 so that whether the laser beam source 41 has performed oscillation can be judged, and it is possible to determine the specified value without necessarily conducting an experiment which measures the processing conformation. A method of setting the specified value in this case will now be described with reference to FIG. 8.

Figure 8:
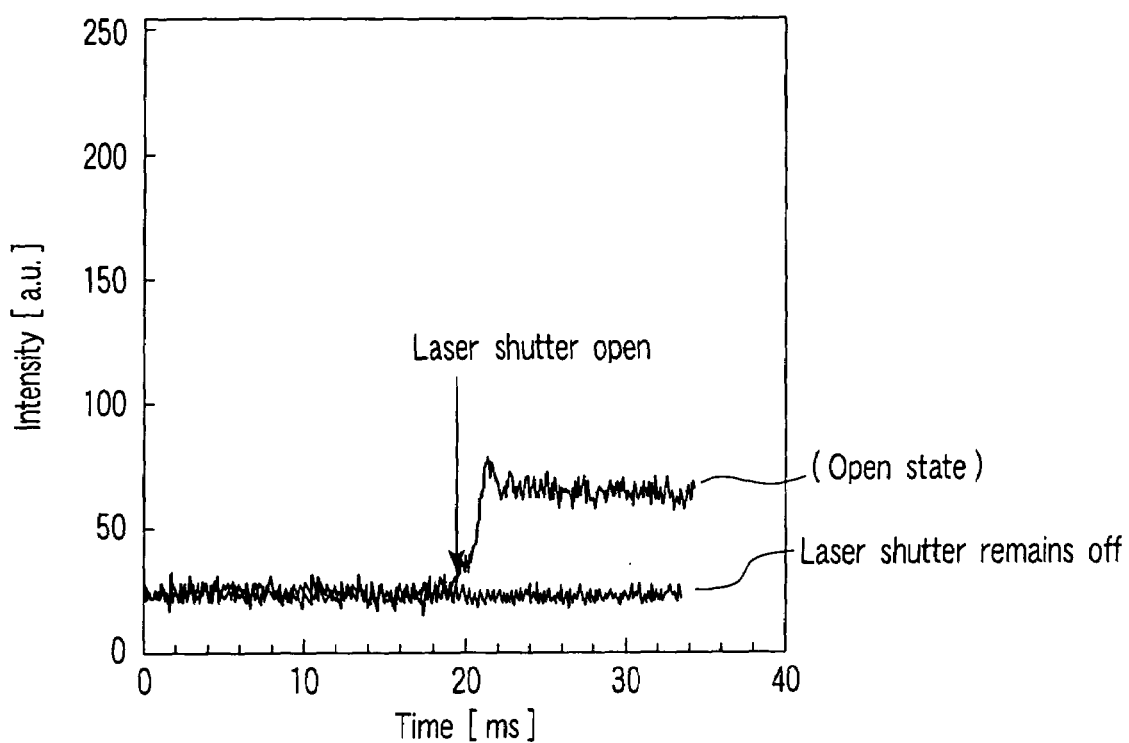
FIG. 8 is a photodetector output waveform chart when a laser beam is applied, which illustrates a process of determining the specified value of the laser processing apparatus depicted in FIG. 2.
Figure 12:
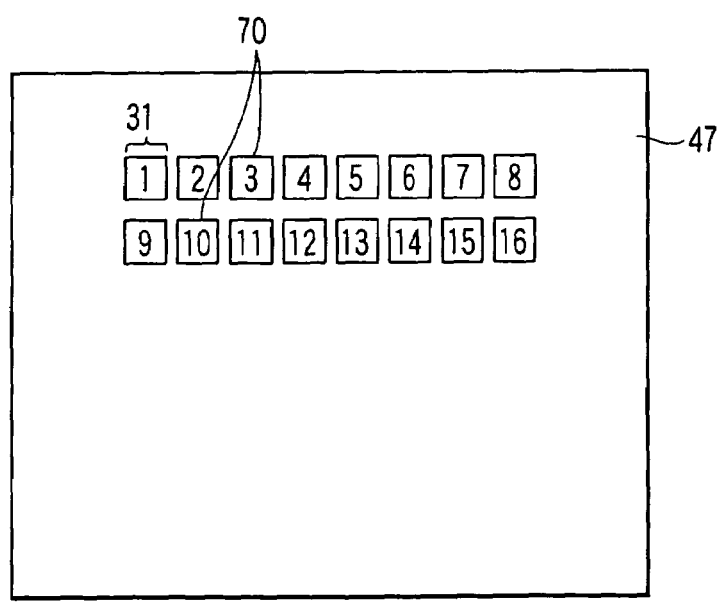
FIG. 12 is a plan view illustrating a crystallized processing target body according to a sixth embodiment of the present invention.

FIG. 8 shows photodetection values of the photodetector 49 before and during laser irradiation. Here, a signal which fluctuates around 25 (an arbitrary unit: a. u.) is output before laser beam irradiation. This is an output signal due to noise of the photodetector 49, and depends on performance and an individual difference of the photodetector 49 and environments of the photodetector 49 (a temperature, humidity, stray light and others).

Here, even if laser oscillation is not performed, this noise is called a detection value of the photodetector 49, and an output signal from the photodetector 49 is called a detection value even though a laser beam is not actually detected. That is because a signal from the photodetector 49 is generically called a detection value of the photodetector 49 since various cases of laser oscillation such as a case where a laser beam is not applied or a case where weak light is applied can be assumed.

When a laser beam is applied, a detection value of the photodetector 49 is increased, and a signal of approximately 65 (a. u.) is output in case of FIG. 8. This increase in a signal intensity depends on an S/N ratio (a signal-to-noise ratio) of the photodetector 49, a light quantity of light separated from an optical component and others. In order to judge whether a laser beam is applied, an accurate judgment can be made as a difference between a detection value before this laser irradiation and a detection value during the laser irradiation is large, but an increase in a signal which is approximately 1.50 times is required at minimum.

Even if a light quantity of a laser beam separated from an optical element to enter the photodetector 49 is increased, a detection value is increased. However, a very strong laser beam enters the photodetector 49, sensitivity of the photodetector 49 is deteriorated because an excimer laser beam has a short wavelength and a high energy. Therefore, it is not preferable for the photodetector 49 to output an extremely high detection value.

As a specified value which is used to judge whether laser irradiation has been carried out, a normal judgment cannot be made unless a value corresponding to a detection value which is at least 1.20 times a detection value before laser irradiation is determined as the specified value.

In the first embodiment, as shown in FIG. 2, the pulsed laser beam 40A reflected from the processing target body 47 is detected by the photodetector 49, and a signal indicative of this beam detection value is transmitted to the computer 51 through the signal line 50.

SECOND EMBODIMENT

A second embodiment is an example in which a processed state of a processing target body 47 is optically observed and a desired processed state and an unprocessed state are judged. FIG. 9 is a system block diagram illustrating an embodiment of an ablation apparatus which optically observes and evaluates a processed state (a result) of the processing target body 47. Like reference numerals denote parts equal to those in FIGS. 1 to 8, and their detailed explanation will be eliminated.

As shown in FIG. 9, the second embodiment is an example where a part of the processing target body 47 processed by a pulsed laser beam 40 from a laser beam source 41 is illuminated by additionally prepared optical observing means so that a processed result is observed. A probe light source 54 may be a lamp or a semiconductor laser which performs continuous oscillation. The processed position is irradiated with a laser beam emitted from this probe light source 54.

A photodetector 49 is arranged at a position where a laser beam of the probe light source 54 which has been reflected from the processed position of the processing target body 47 can be received. This photodetector 49 detects evaluation information of a processed state of the processed position. The photodetector 49 transmits a detection signal indicative of this information to a computer 51 through a signal line 50. An evaluation method according to this embodiment uses the pulsed laser beam 40 and the different probe light source 54, and utilizes a fact that a reflection factor from the processed position when normal processing has been carried out by the laser beam is different from a reflection factor from the processed position when processing has not been normally executed.

Therefore, quality of processing is grasped and determined based on whether a signal value monitored by the photodetector 49 is a value obtained when normal processing has been carried out (non-normal/normal).

As described above, according to this embodiment, the photodetector 49 can acquire a value in which a processed status of the processing target body 47 is sufficiently reflected. Therefore, it is possible to get free of a trouble (deterioration in an optical component, accidental attachment of foreign particles and others) between a laser beam intensity monitoring position and the processing target body 47 which cannot be eliminated by a conventional method which makes a judgment based on a partial light intensity in an optical path. As a result, the judgment, which is stable for a long time, on quality of processing with respect to a material of the processing target body 47 can be accurately made.

THIRD EMBODIMENT

Figure 10:
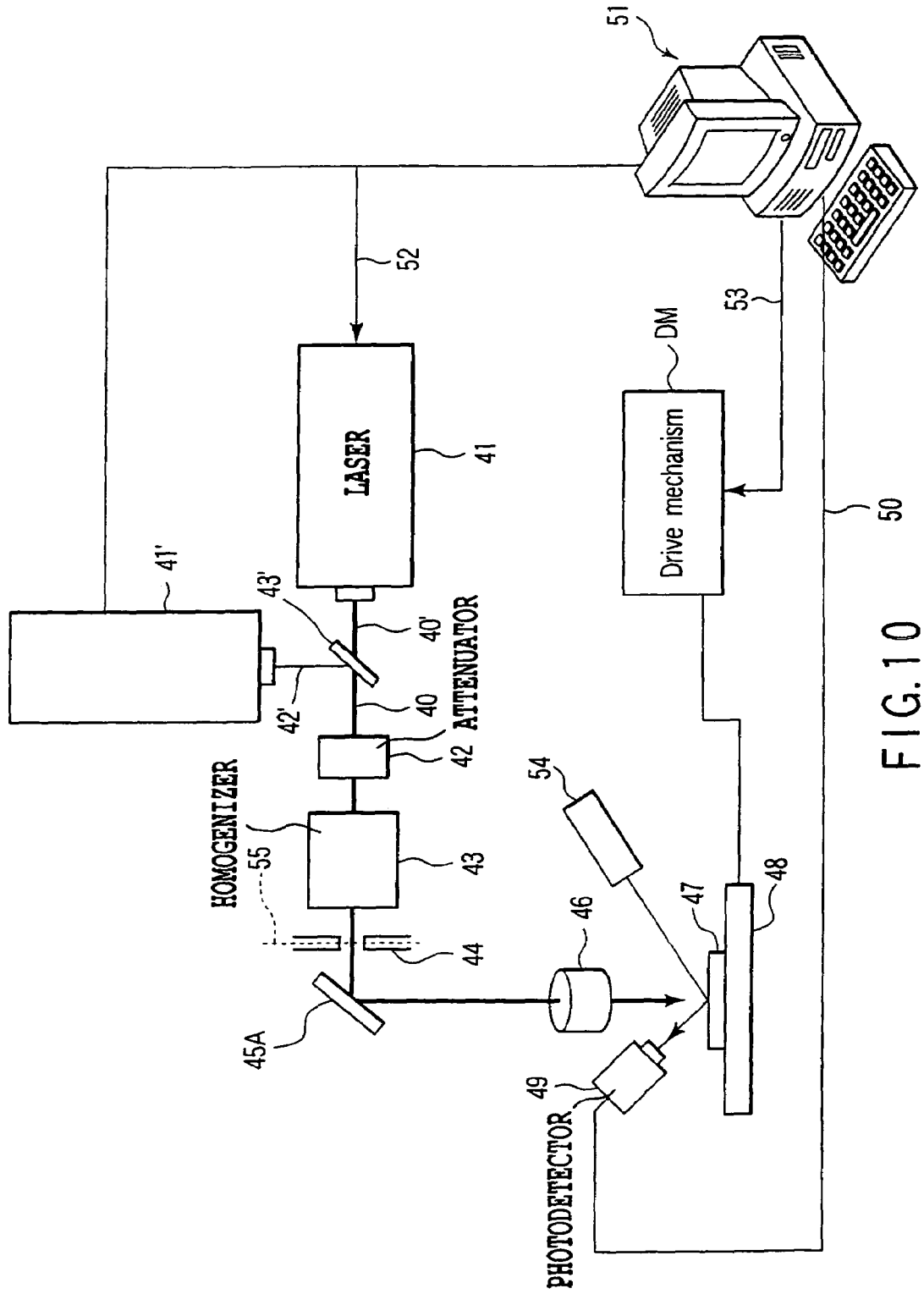
FIG. 10 is a system block diagram illustrating a laser processing apparatus according to a third embodiment of the present invention.

As shown in FIG. 10, a third embodiment is an example in which a laser beam source 41 and a second laser beam source 404 are prepared and a processed position of a processing target body 47 is illuminated by additionally prepared optical observing means to observe each processing result each time. A pulsed laser beam 401 emitted from the laser beam source 41 is combined with a pulsed laser beam 402 emitted from the laser beam source 404 by a half mirror 403, and the laser beam emitted from each laser beam source becomes a pulsed laser beam 40 after transmitted through the half mirror 403. Usually, one of the laser beam source 41 and the laser beam source 404 is used to perform processing.

A photodetector 49 detects evaluation information of a processed state of the processed position, and quality of processing is grasped and determined based on a fact whether a signal value monitored by the photodetector 49 is a value obtained when normal processing has been carried out (normal/non-normal). If a value of the photodetector 49 indicates insufficient processing, processing at the same position (retry) is repeatedly carried out. In case of using one laser beam source only, if the laser beam source has a defect, retry due to insufficient processing is performed endlessly. Therefore, when a predetermined number of times of retry has been effected, the apparatus must be stopped. In this embodiment, however, if the predetermined number of times of retry has been carried out, it is determined that the laser beam source has a failure, and processing can be restarted by using another laser. For example, in a case where retry due to insufficient processing is frequently performed when using, e.g., the laser beam source 41, a computer 51 determines to stop the laser beam source 41 and switches to the second laser beam 404, thereby improving throughput.

Although the description has been given as to the ablation processing in the foregoing embodiments, the present invention can be likewise applied to a processing method which forms a crystalline semiconductor thin film from a non-single-crystal semiconductor film which is used for a TFT as a semiconductor device. Further, the processing for a semiconductor thin film does not have to be restricted to a crystallization method, and it can be used for, e.g., activation of a semiconductor implanted layer based on laser annealing as the laser processing method. A description will now be given as to activation based on laser annealing which is another application of the laser processing method.

FOURTH EMBODIMENT

This embodiment is an example applied to a process of forming a very shallow pn junction, which is superior to a conventional junction, by using an excimer laser as means for activating an impurity in order to form a pn junction in a shallow region of a semiconductor thin film.

Figure 11A:
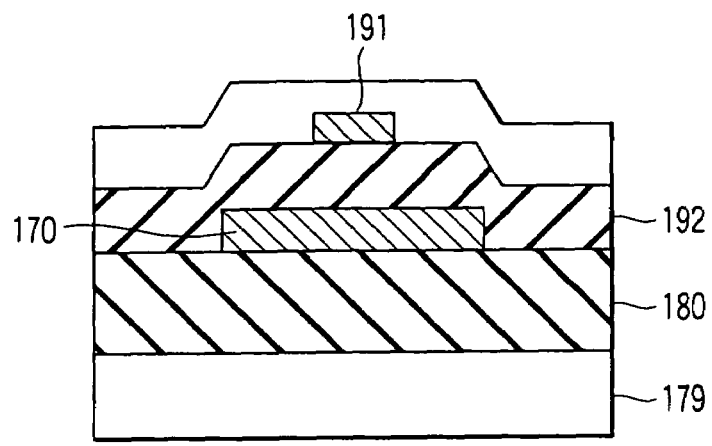
FIGS. 11A to 11C are cross-sectional views illustrating a fourth embodiment of the present invention.
Figure 11B:
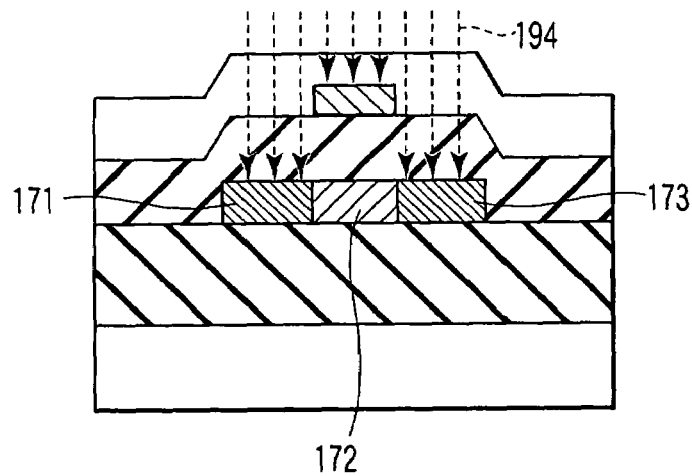
Figure 11C:
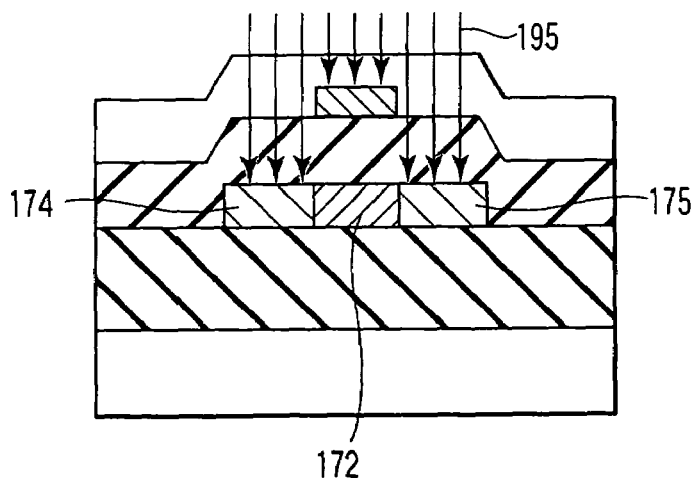

Referring to FIGS. 11A to 11C, a method of activating an impurity of a semiconductor will be described taking activation of an impurity of an n type thin film transistor as an example. FIG. 11A is a cross-sectional structural view of a thin film transistor before ion implantation. An underlying insulating film 180 having a thickness of approximately 1 µm is provided on a substrate, e.g., a glass substrate 179, and a polysilicon film 170 having a film thickness of approximately 50 nm is formed in an island-like shape on this underlying insulating film 180. This polysilicon film can be formed by a method of changing amorphous silicon into polysilicon by a laser, a method of changing amorphous silicon into polysilicon by oven annealing, or a method of directly depositing polysilicon by CVD (chemical vapor deposition). Furthermore, a gate insulating film 192, e.g., $SiO_2$ having a thickness of 100 nm is deposited on this polysilicon film. A gate electrode 191, e.g., aluminum (a film thickness: 200 nm) is formed on the polysilicon film 170 through this gate insulating film 192. Moreover, $SiO_2$ having a film thickness of 100 nm is deposited as a passivation film on the gate electrode 191 by CVD.

Then, as shown in FIG. 11B, ion implantation 194 of phosphor as an impurity is carried out. Then, the gate electrode 194 is used as a mask, a channel region 172 directly below the gate electrode 194 remains as polysilicon, and phosphor is implanted into the polysilicon film 170 so that an amorphized source region 171 and an amorphized drain region 173 are formed. A general method then performs oven annealing and restores crystallinity of the source region 171 and the drain region 173 to activate the impurity, but laser activation is processed as follows.

As shown in FIG. 1C, a laser 195 is used to continuously emit laser beams. Then, the amorphized source region 171 is recrystallized to be a phosphor-doped source region 174, and the amorphized drain region 173 is recrystallized to be a phosphor-doped drain region 175. That is because the source and drain regions are heated by laser irradiation, and hence crystallinity is restored and phosphor is doped with a high concentration, thereby effecting activation.

In case of activation based on laser annealing using regular laser beam irradiation (FIG. 11C), a light-unemitting shot is a serious problem leading to a reduction in a yield ratio. A part where a light-unemitting shot has occurred is not activated since it has no light emission or no light emission intensity required for activation, and an element having considerably deteriorated electrical characteristics is formed.

As a method of solving this problem, performing the laser processing method using the laser processing apparatus according to Embodiments 1 and 2 can achieve formation of an excellent element having no part which is not activated, thereby solving the problem. In the laser processing method, a specified value for a photodetection value is obtained by an activation evaluating experiment. In the activation evaluating experiment, for example, a processing target body 47 having an impurity implanted therein is used as an test substrate, and a change in a sheet resistance of an impurity implanted layer is measured by a four-terminal method using laser irradiation. If activation is sufficiently achieved, a low resistance value is presented, and a specified value is thereby determined based on whether this value is a satisfactory value in creation of an element. The activation evaluating experiment is not restricted to this method, and activation can be obtained by any method, e.g., electrical measurement or physical measurement, and determined by using these methods.

Although the present invention can be used in a liquid crystal display apparatus as a semiconductor element and a display device using a semiconductor element, it is not restricted thereto, and it can be likewise applied to, e.g., an organic EL display apparatus.

FIFTH EMBODIMENT

Although the description has been given as to the laser processing method and the laser processing apparatus used in the semiconductor field in the foregoing embodiments, the problem of a light-unemitting shot is also an important problem in crystallization using an excimer laser.

The present inventors discovered that the laser processing apparatus and the laser processing method according to the present invention are effective in processing based on a laser annealing apparatus which is used as laser processing.

SIXTH EMBODIMENT

An excimer laser crystallization apparatus using the present invention will now be described. Like reference numerals denote parts equal to those in FIGS. 1A to 11C, and their detailed explanation will be eliminated. A non-single-crystal semiconductor thin film (an amorphous silicon thin film in this case) deposited on a processing target body 47 was irradiated with a laser beam having a fixed laser beam intensity (350 mJ/cm$^2$), thereby effecting crystallization (polycrystal silicon in this case). The processing target body 47 is moved in such a manner that a pulsed laser beam is intermittently applied to the processing target body in the order of reference numerals 1, 2 and 3 from an upper left part, and annealing processing is carried out every shot. In this process, for example, during processing of the parts indicated by the numbers 3 and 10, when an alert is displayed in the laser display device, the processing target body 47 is not moved, and the second laser beam shot is applied to the same position. When an oscillation intensity of the excimer laser was compared with a record of an oscillation intensity of the laser beam source 41 at a shot position displayed as the alert, it was revealed that the oscillation intensity of the excimer laser is extremely small. Therefore, a non-normal value was detected as described above, a shot denoted by 70 was able to avoid a laser annealing defect, i.e., a laser processing defect based on a light-unemitting shot.

A further object of the embodiment according to the present invention will now be described again based on FIG. 1. First, a description will be given as to a crystallinity evaluating experiment which can be a criterion of judging quality, i.e., an irradiation light intensity of a laser beam is a normal value which satisfies a specified value or an abnormal value which does not satisfy the specified value in the excimer laser processing method and processing apparatus.

A laser beam emitted from a pulsed oscillation laser beam source as a light source has an intensity in a two-dimensional space homogenized by a homogenizing optical system, e.g., a homogenizer set on an exit side, and this laser beam is shaped into a laser beam 31 which is rectangular in a two-dimensional plane shown in FIG. 1A and has a homogeneous laser beam intensity. In this laser beam 31, a one-dimensional light intensity distribution on a central line 32 is homogenized as shown in FIG. 1B, and a one-dimensional light intensity distribution on a central line 33 is homogenized as shown in FIG. 1C. Such a laser beam 31 was used to crystallize an amorphous thin film, e.g., an amorphous silicon thin film formed on a glass substrate as a non-single-crystal semiconductor film with a fixed laser beam intensity of, e.g., 700 mJ/cm$^2$.

Although the amorphous silicon thin film was quoted as an amorphous thin film herein, a polycrystal thin film having a microcrystal structure may be included in the amorphous thin film in some cases. The polycrystal thin film described herein means a film having a polycrystal structure aboundingly including microcrystals (not greater than sub-micron) in the film and has a fine crystal structure, but crystallization in the present invention intends to form a crystal structure including crystal grains having a size of several microns or several-ten microns. In that sense, a polycrystal thin film having a microcrystal structure which does not have intended crystal grains is determined as an amorphous thin film. An amorphous thin film (an amorphous silicon film in this example) of a crystallization target substrate 47 was irradiated with the laser beam 31 to fuse an irradiation region, and this region was crystallized in a temperature reduction process. A stage was moved in directions X and Y in accordance with each pulse irradiation of the pulsed laser beam, and the irradiation region was sequentially shifted by moving an irradiation position of one shot in the direction X in the order of "1", "2", "3" . . . from an upper left part as shown in FIG. 1D so that the crystallization target substrate 47 is subjected to a crystallization process (the substrate and the laser beam 31 are relatively moved). Upon completion of irradiation of one row in the direction X, the irradiation position was shifted in a direction of the next row (a direction of −Y), and irradiation was again sequentially carried out at a fixed pitch in accordance with each shot (FIG. 1D). In FIG. 1D, a laser irradiation region by one shot is illustrated as a rectangular frame.

In FIG. 1D, an irradiation region denoted by a dotted line is illustrated as a part 34' where crystallization is not carried out at all. This uncrystallized region is produced due to an abnormal shot of the excimer laser beam source 221. This abnormal shot position information is stored. Upon completion of the crystallization process with respect to one crystallization target substrate 227, the abnormal shot position information is read, and a crystallization laser beam is again applied to execute the crystallization process. As a result, the crystallization target substrate 227 can be crystallized without a non-crystallized region due to an abnormal shot, thereby terminating the crystallization process. As the embodiment shown in FIG. 1D, each laser irradiation region illustrated as the rectangular frame is a region corresponding to each pixel of a display device, e.g., a liquid crystal display device. That is, the regions corresponding to respective pixels all become crystallized regions, thereby obtaining a defect-free display device. In this crystallized region, a pixel switching transistor is formed with a thin film transistor structure.

Using the following laser crystallization apparatus and laser crystallization method with respect to a part which is not crystallized or insufficiently crystallized due to such an abnormal shot can achieve a manufacturing process having excellent transistor characteristics in all aspects.

SEVENTH EMBODIMENT

An embodiment of each of a laser crystallization apparatus and a laser crystallization method will now be described with reference to FIG. 13A. In these examples, an excimer laser beam source 221 (e.g., XeCl, KrF, ArF and others) is used as a light source, but the present invention is not restricted thereto.

Figure 13A:
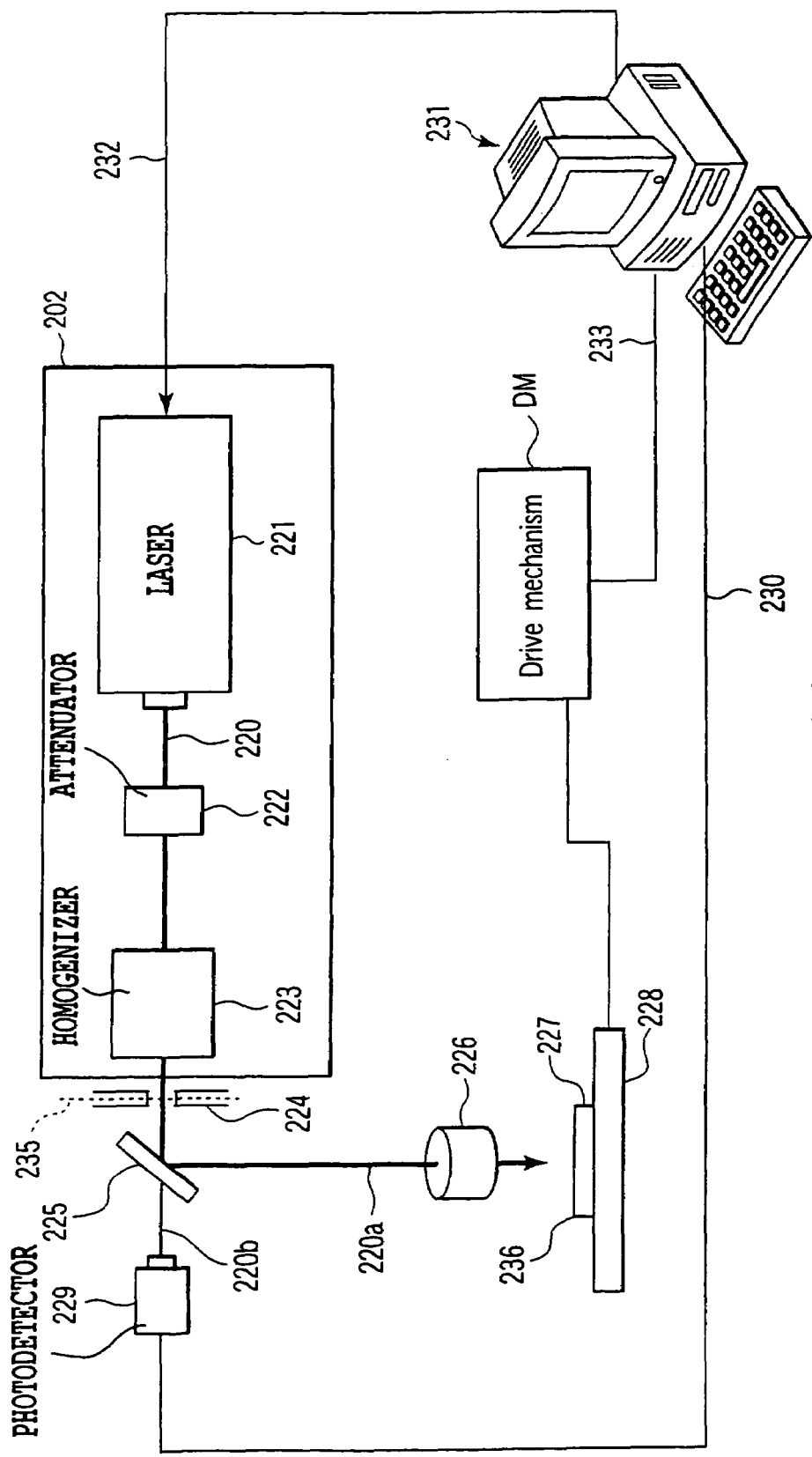

As shown in FIG. 13A, an attenuator 222 which controls energy density of a laser beam 220 to a predetermined light intensity required for crystallization and a homogenizing optical system 223 which homogenizes an in-plane light intensity of the laser beam are sequentially arranged on an exit side of the excimer laser beam source 221 which emits the pulsed laser beam 220.

It is to be noted that a position denoted by reference numeral 235 is a position which has an image forming relationship with a crystallization target substrate 227 with respect to an image forming optical system 226, and an optical element 224 which shapes an intensity distribution of the laser beam 220 homogenized by the homogenizing optical system 223 is arranged at this position. The optical element is an optical component which has a shaping function in order to prevent light from being transmitted through a part where a light intensity of peripheral light of the laser beam is attenuated. The optical element 224 is, e.g., a metal mask having a rectangular opening portion or an optical mask having, as a base material, quarts or the like obtained by depositing a non-translucent material on a translucent optical component formed of quarts or the like and removing the non-translucent material in a rectangular shape by etching.

An optical component which separates a crystallization laser beam and a detection laser beam from each other, e.g., a half mirror 225 which performs 90-degree reflection and partial transmission is arranged in an exit optical path of the homogenizing optical system 223. The laser beam reflected by the half mirror 225 is applied and image-formed as a crystallization laser beam 220a on the crystallization target substrate 227 mounted on a sample stage (a stage) 228. A light receiving region of an amorphous silicon film 236 on the crystallization target substrate 227 is melted, and crystallized in a temperature reduction process.

Further, on the other hand, a detection laser beam 220b transmitted through the half mirror 225 is received by a photodetector 229, and its received light signal intensity is input to a computer 231 which performs light intensity detection and analysis through a signal line 230.

The half mirror 225 as an optical component which separates the crystallization laser beam 220a and the detection laser beam 220b from each other and the photodetector 229 which are characteristic of the laser crystallization apparatus will now be described in detail. The half mirror 225 described herein means an optical component which reflects and transmits therethrough incident light, but does not mean that its transmission quantity and reflection quantity are equal, and an optical component with which reflected light and transmitted light exit can suffice. The half mirror 225 is a mirror but not restricted to a tabular mirror only, and it may have a polygonal shape or a prism shape. Furthermore, it does not have to separate two lights by using phenomena of reflection and transmission, and it is good enough to separate the crystallization laser beam and the detection laser beam from each other by an optical component. Moreover, the present invention is not restricted to the two split lights, and it is good enough to split light into a plurality of lights so that one is applied to the crystallization target substrate 227 for crystallization and the other enters the photodetector 229 for light intensity detection.

As the photodetector, for example, an optical power meter which is manufactured by Opto Science, Inc and has a model number FL250A-EX is used. However, the photodetector 229 is not restricted to this model, and the photodetector 229 having light sensitivity with respect to the excimer laser beam 220b can suffice. Additionally, it is possible to use the photodetector 229 which does not have light sensitivity with respect to the excimer laser beam 220b but has detection sensitivity with respect to a regular visible light region, and detects the excimer laser beam 220 as visible light by using on a front surface of the photodetector 229 a filter which converts ultraviolet light into visible light or a filter on which a fluorescent material is applied to generate fluorescence in a visible light region on a wavelength side higher than an excimer laser wavelength by ultraviolet radiation.

Figure 13B:
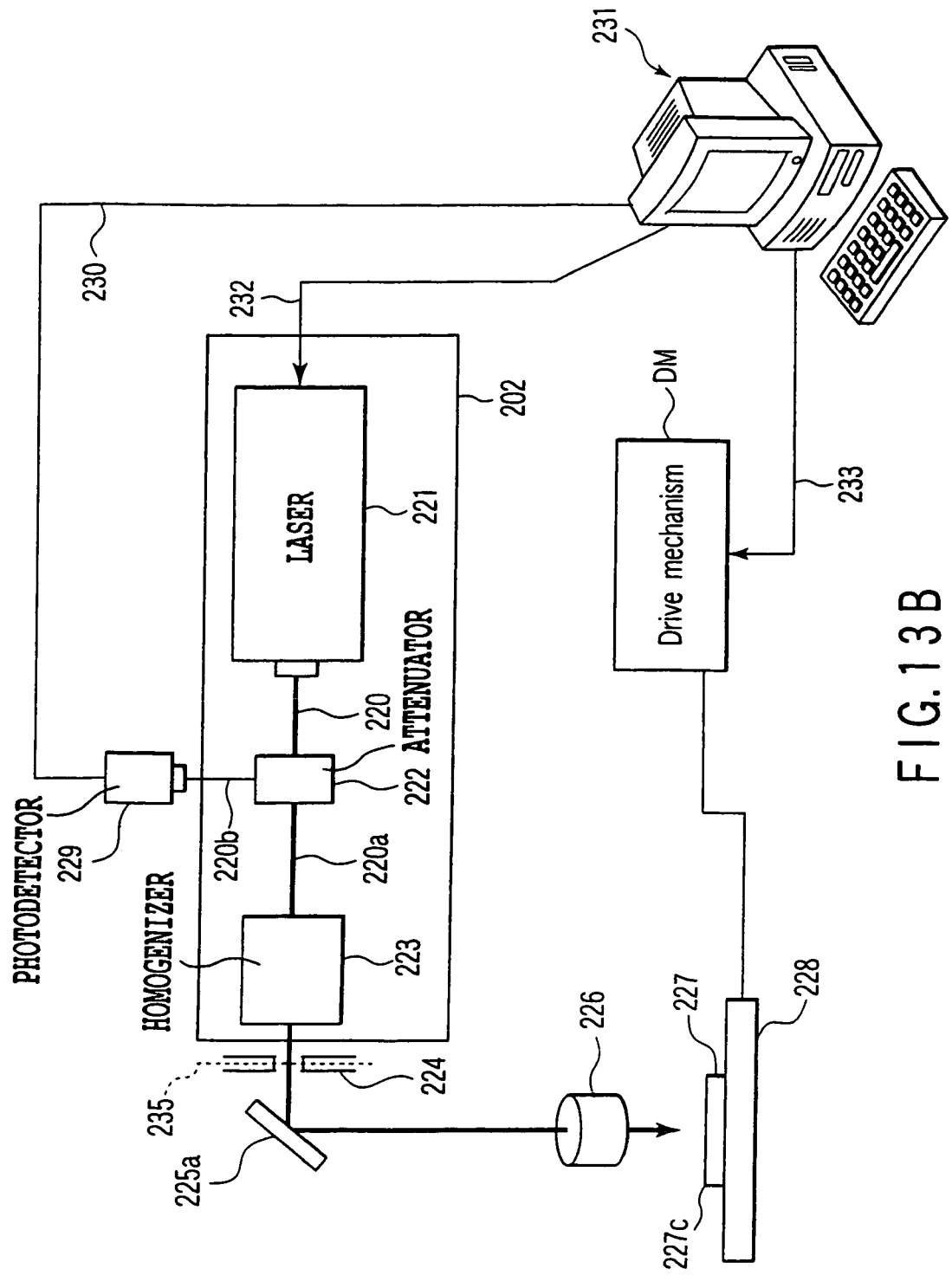
Figure 13C:
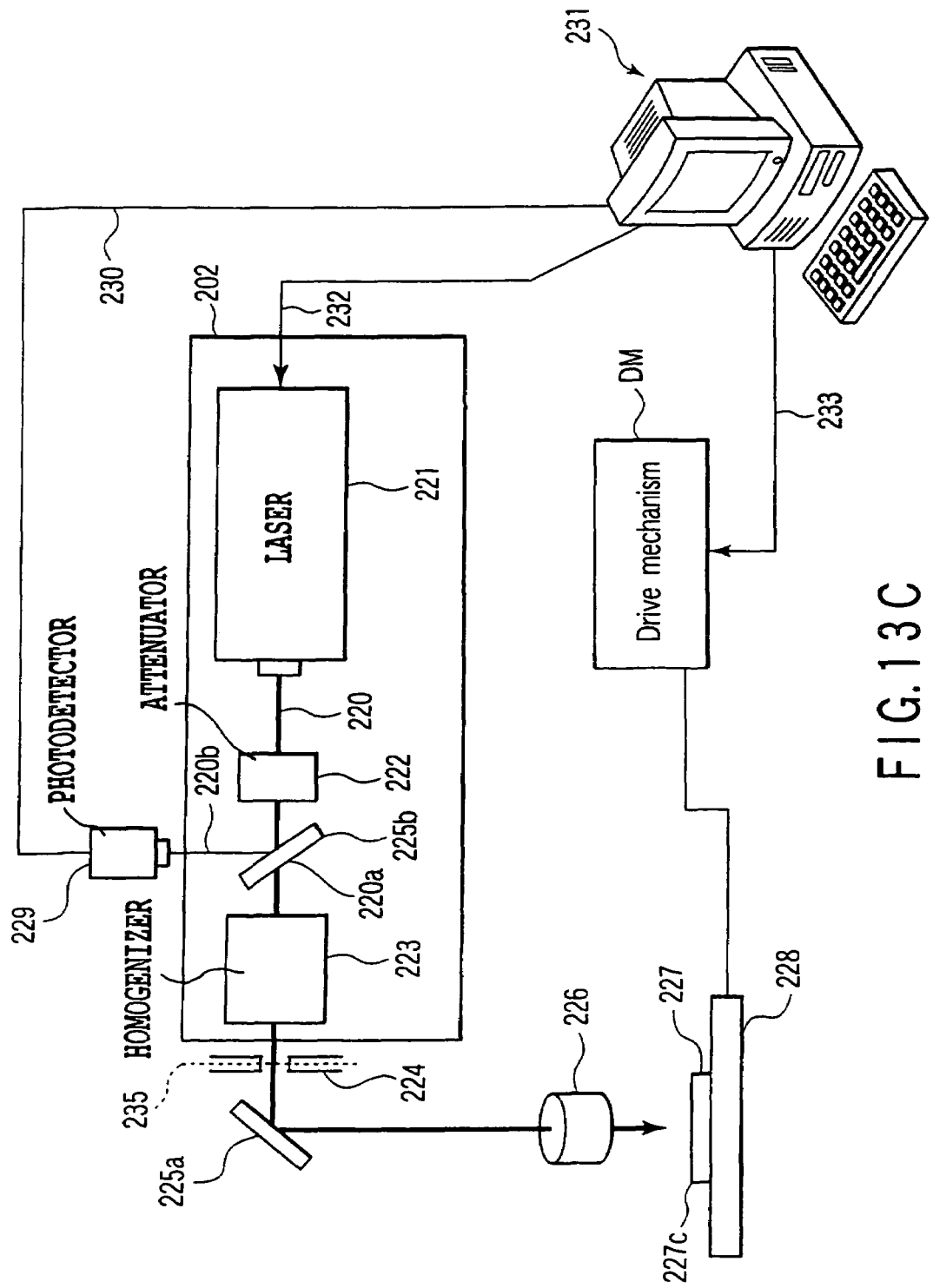
Figure 13E:
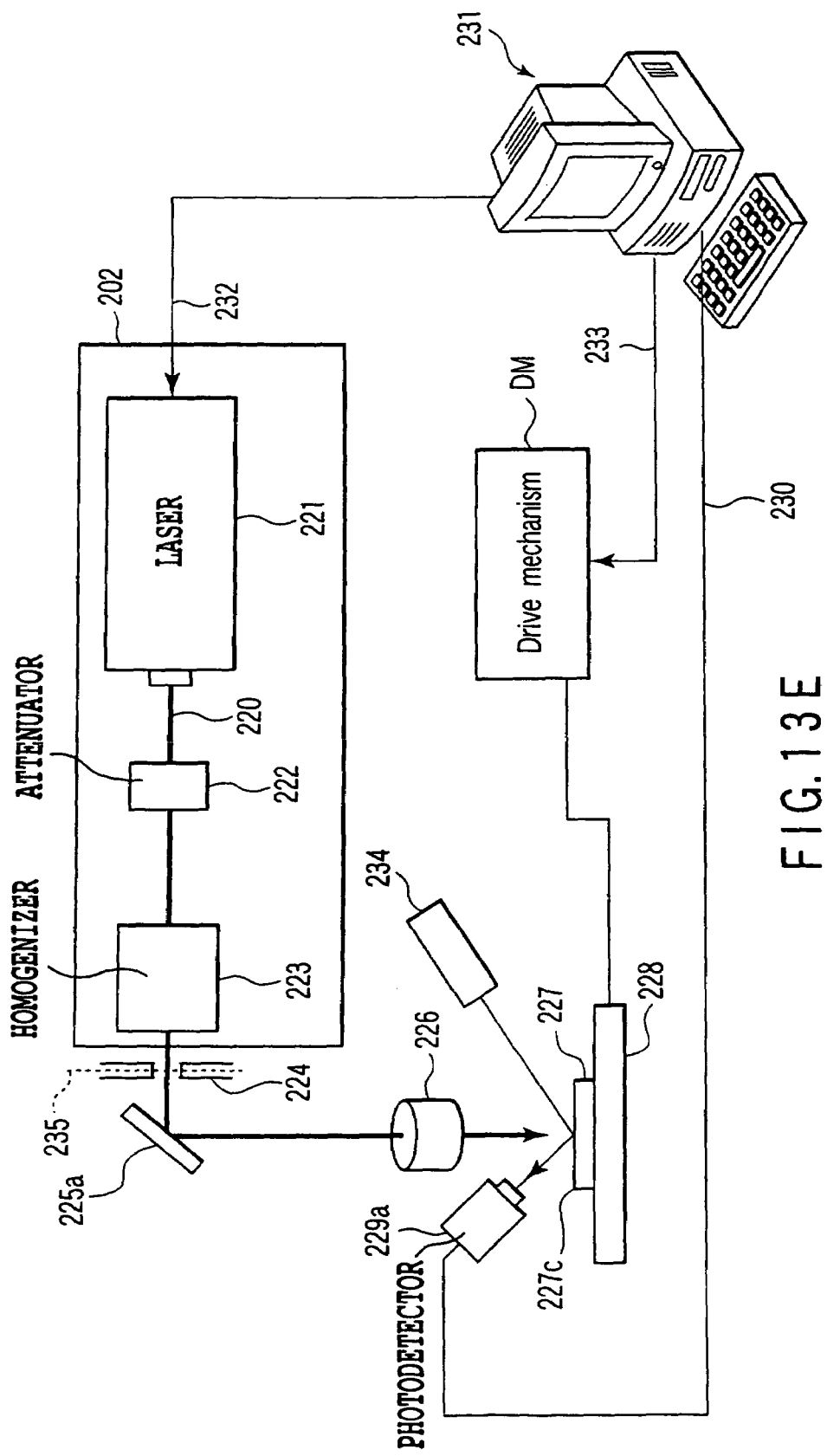
Figure 13F:
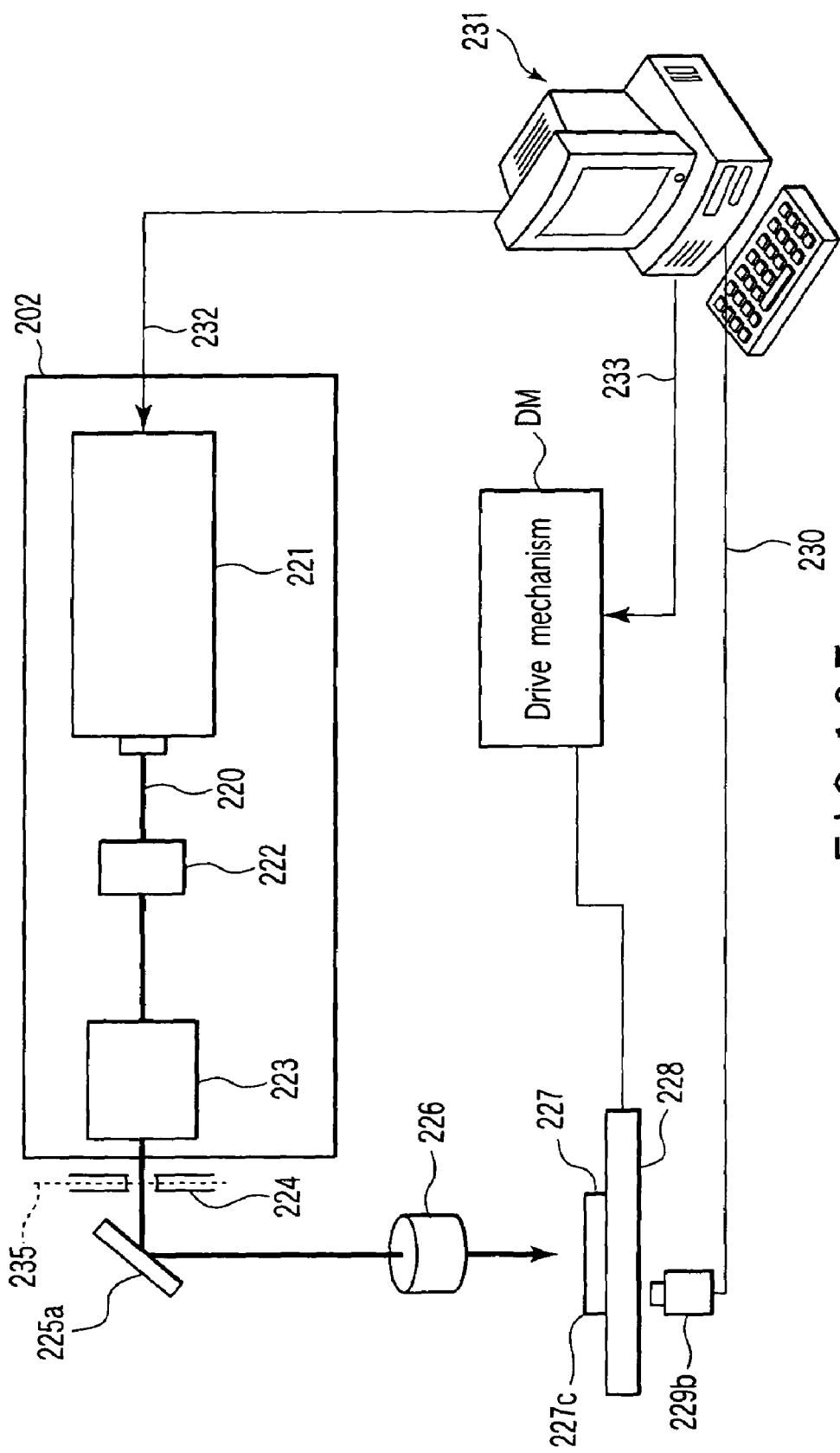
Figure 14:
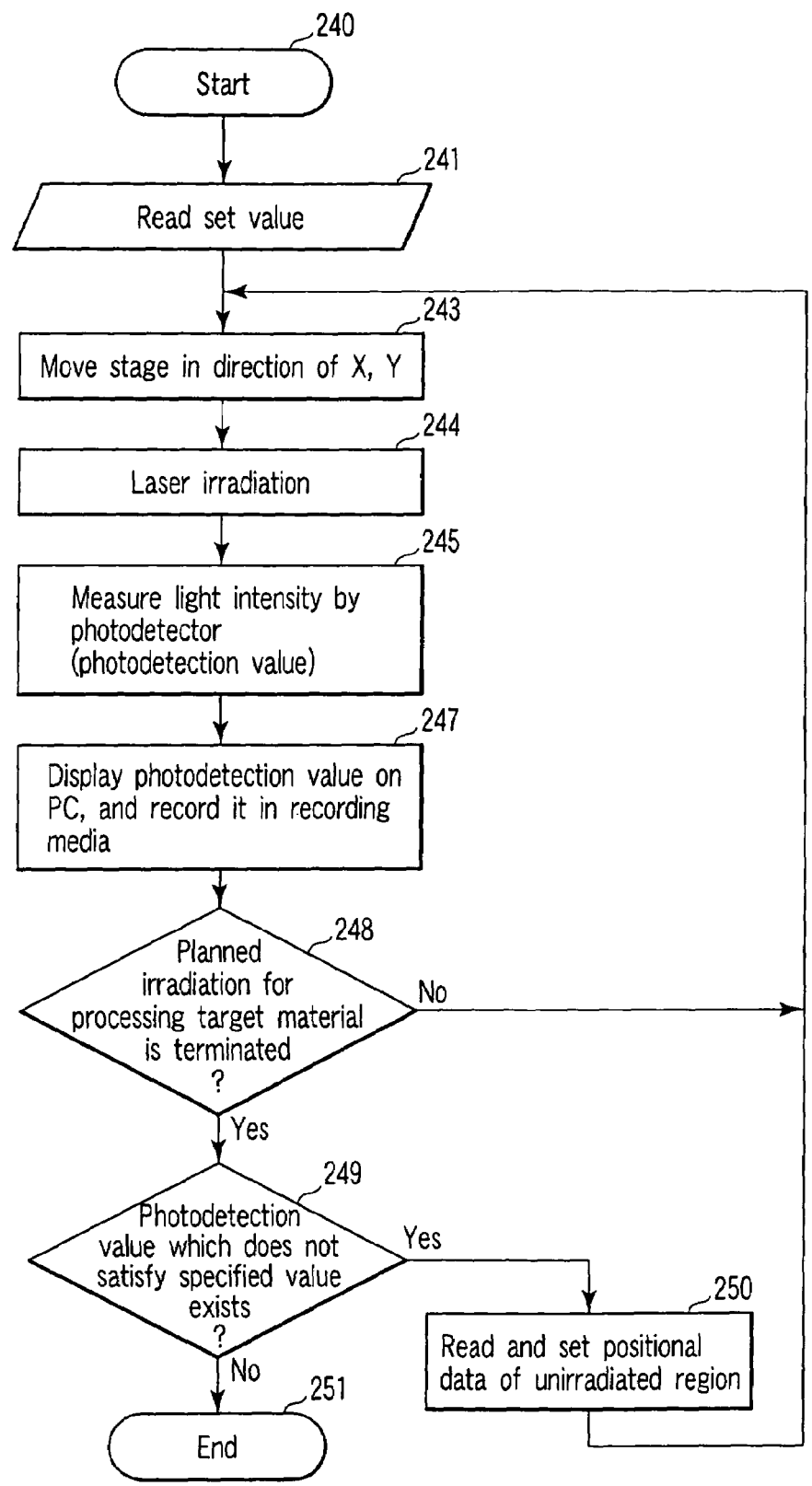
FIG. 14 is a flowchart illustrating the crystallization method depicted in FIG. 13A.

A detection value detected by the photodetector 229 is input to the computer 231, and compared with a specified value predetermined as a crystallization energy value, and then processed. When a pulsed laser beam whose value is not greater than the specified value is emitted, the computer 231 stores this irradiation position information as abnormal shot position information in a storage device. The crystallization process using the pulsed laser beam is not stopped, and irradiation of the next crystallization pulsed laser beam is continued. FIG. 14 shows a flowchart of this crystallization process, and the crystallization process will now be described with reference to FIG. 14. Like reference numerals denote parts equal to those in FIGS. 1A to 13F, thereby eliminating their tautological explanation.

As the above-described storage device, there is a storage device such as a floppy disk (a registered trademark), a silicon memory, a hard disk drive (HD), a magneto optical disk (MO), a compact disk (CD), a DVD or the like. Set values required for crystallization are called from this storage device, and initialization is carried out. Here, the necessary set values are control data for the stage 228, an irradiation position to be processed, threshold values of an irradiation energy and a predetermined crystallization energy, and others (a step 241). Then, the computer 231 moves the stage 228 to a planned irradiation position at which the crystallization target substrate 227 should be irradiated with a laser beam (a step 243).

The computer 231 performs oscillation control over the excimer laser beam source 21 to emit a first laser shot (a step 244). At this time, the photodetector 229 detects a laser beam intensity of a laser beam separated by the half mirror 225 (a step 245), and transmits the detected value (a photodetection value) to the computer 231 through a signal line 230.

Then, the computer 231 transmits a command signal to move the stage 228 for processing at the next step, and the drive device moves the stage 228 in response to this command, thereby continuing the laser beam irradiation processing (steps 243 to 248). When processing has been carried out with respect to all planned irradiation positions of the crystallization target substrate 227 to be processed, an end judgment is made (a step 248). The computer 231 compares a predetermined specified value with values detected by the photodetector 229, and judges whether the detected values fall within a range of the specified value (a step 249). If all the detected values fall within the range of the specified value, it is determined that the processing has been completed, whereby the processing of the crystallization target substrate 227 is terminated.

On the other hand, if a detected value of even one shot does not fall within the range of the specified value, i.e., if there is a shot which does not satisfy the specified value, the computer 231 reads abnormal shot position information, sets a planned irradiation position at which laser beam irradiation is performed (a step 250), and transmits a command signal to move the stage 228 to the irradiation position. The drive device moves the stage 228 in response to this command, thereby continuing the laser beam irradiation processing (steps 243 and 244). At this time, the photodetector 229 detects the laser beam 220b and outputs a detected result to the computer 231 (a step 245).

In this manner, the computer 231 sequentially reads the abnormal shot position information, controls the crystallization target substrate 227 to be moved to a corresponding position, then performs irradiation control of the pulsed laser beam 220, and executes the crystallization process.

If all the detected values fall within the range of the specified value in this manner, it is determined that the processing has been completed, whereby the processing of the crystallization target substrate 227 is terminated. Here, abnormal light-emitting shots may be continuously generated, or the number of abnormal light-emitting shots may be larger than that of regular processing in the same crystallization target substrate in some cases. In such cases, since it can be considered that laser oscillation, an optical component or the like has any problem, the computer 231 may display an alert in the crystallization apparatus 201 to inform an operator, or may have a function of transmitting an alert signal to the computer managing an apparatus operating status.

In this case, in order to maintain a processing status and a processing history of the crystallization target substrate 227, a specified value when processing the crystallization target substrate 227, i.e., a photodetection value obtained by the photodetector 229 is saved as data in the storage device (a storage device such as a floppy disk (a registered trademark), a silicon memory, a hard disk, a magneto optical disk (MO), a compact disk (CD), a DVD or the like), and a step of outputting this data to a printer or the like may be provided. Thereafter, the crystallization target substrate 227 is collected, and the next crystallization target substrate 227 is carried in and mounted on the stage 228, thereby continuing the same laser beam irradiation processing.

Here, the predetermined specified value is a laser energy quantity required to fuse an irradiation region of amorphous silicon, and it is obtained by an experiment in advance or given by an approximate calculation formula based on an experimental value. The specified value is also affected by a film thickness, a film quality and film forming conditions of an amorphous thin film which is an intended crystallization target film of the crystallization target substrate 227 as well as a film quality, a film thickness and others of an insulating film around this amorphous thin film. That is because a crystallization phenomenon caused by laser irradiation greatly concerns a cooling status of this amorphous thin film, and it can be considered that this cooling status is affected by peripheral films.

Furthermore, an individual difference, a frequency in use and a deterioration status of the excimer laser beam source 221, values such as an individual difference of a reflection factor or a transmission factor of each optical component and others are also reflected in this specified value, and a different value is set in accordance with each laser crystallization apparatus. Moreover, this value varies from day to day (since a frequency in use and a deterioration status of the laser are concerned), and hence a processing status of the processed crystallization target substrate 227 is fed back.

Actually, a crystallization target substrate for monitoring a crystallization status of the crystallization target substrate 27 is used to periodically conduct a crystallinity evaluating experiment of, e.g., a grain diameter of a crystal grain (a scanning electron microscope (SEM), a transmission electron microscope (TEM)), measurement of crystallinity (an electron backscattering process (EBSP), an X-ray diffraction method (XRD), a reflection high energy electron diffraction method (RHEED)), a crystallization status (a change in a light reflection factor before and after processing, a change in electrical characteristics based on a four-terminal measurement method or the like, a change in an absorption factor in an infrared region using FTIR) and others, and obtained results are reflected in the specified value.

Figure 15:
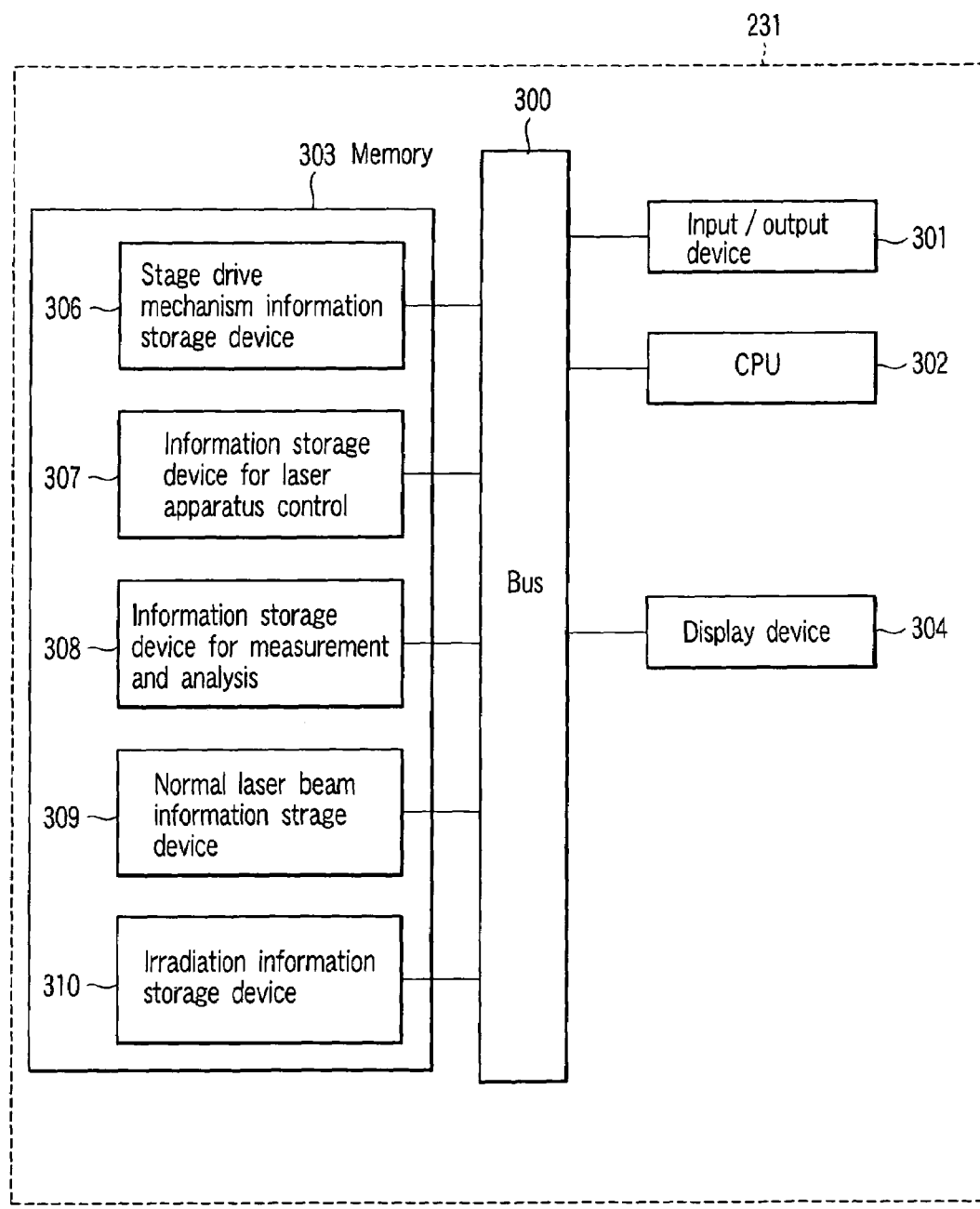
FIG. 15 is a system block diagram illustrating a configuration of a control system depicted in FIG. 13A.

A control system for the crystallization process using the computer 231 depicted in FIG. 13A will now be described with reference to FIG. 15. FIG. 15 is a system block diagram of the computer 231. Like reference numerals denote parts equal to those in FIG. 13A, thereby eliminating their tautological detailed explanation.

To a bus line 300 are connected inputting/outputting means 301, a central processing unit (which will be referred to as a CPU hereinafter) 302 which executes a crystallization process based on a previously stored operation program, a memory 303 which stores a predetermined operation program and others, and a display device 304 which displays input/output information.

To the memory 303 are connected a stage drive mechanism information storage device 306 which stores a program required to automatically move the stage 228, on which the crystallization target substrate 227 as a non-single-crystal semiconductor film is mounted, in accordance with a predetermined procedure, a pulsed laser beam source 221 which outputs a pulsed laser beam for crystallization, and a laser apparatus control information storage device 307 which stores a program required to control an attenuator 222.

Additionally, the memory 303 includes a measurement/analysis information storage device 308 which stores a program required to measure a light intensity of each pulsed laser beam emitted from the pulsed laser beam source 221 and judges whether the pulsed laser beam is applied to the next irradiation position when the measured value is not smaller than a specified value and whether a pulsed laser beam irradiation process is again required when the measured value is not greater than the specified value, a normal laser beam information storage device 309 which stores a previously obtained light intensity for crystallization as normal light intensity information, and an irradiation information storage device 310 which stores a measurement result.

An embodiment of the crystallization process will now be described with reference to FIGS. 13A and 15. First, before executing the crystallization process, the CPU 302 reads a program stored in the memory 303, performs control to move the crystallization target substrate 227 from an optical path of the laser beam 220 or the sample stage 228 which supports this crystallization target substrate 227 to a predetermined retraction position, thereby positioning the crystallization target substrate 227. Then, the CPU 302 reads a crystallization program from the memory 303, and controls emission of the pulsed laser beam set to have a crystallization light intensity from the laser beam source 221.

The emitted laser beam is divided into a detection laser beam and a crystallization laser beam by an optical component such as a half mirror, and the detection laser beam is detected by the photodetector 229. The CPU 302 stores light intensity information detected by this photodetector 229 in the memory 303. The CPU 302 reads data from the measurement/analysis information storage device 308 and the normal laser beam information storage device 309, compares the read data with the detected light intensity information, outputs judgment information indicating that the light intensity is within or out of a normal range, and stores it in the memory 303 in association with irradiation position information.

If it is determined that the light intensity is within the normal range, the CPU 302 displays this result in the display device 304, and stores it in the normal laser beam information storage device 309. At the same time, the CPU 302 reads a program required to move the sample stage 228 from the stage drive mechanism information storage device 306, and control information required move the sample stage 228 to the next irradiation position to the drive mechanism DM.

On the other hand, if it is determined that the light intensity is not greater than the specified value and it is out of the normal range, the CPU 302 displays this judgment information as an output defective shot in the display device together with the irradiation position information, and stores it in the measurement/analysis information storage device 308. At the same time, the CPU 302 likewise stores this irradiation position as a light intensity insufficient irradiation position in the stage drive mechanism information storage device 306. When a series of irradiation process of the crystallization target substrate 227 which is a non-single-crystal semiconductor film is finished, the CPU 302 calls previously stored irradiation position information which is not greater than the specified value (the light intensity insufficient irradiation position information), reads a laser apparatus control program from the laser apparatus control information storage device 307, and drives the stage 228 to move to a light intensity insufficient irradiation position, thereby again executing application control. Then, the excimer laser beam source 221 is controlled to again control emission of the laser beam. Such a crystallization process is repeated to execute the predetermined extensive crystallization process.

Figure 16:
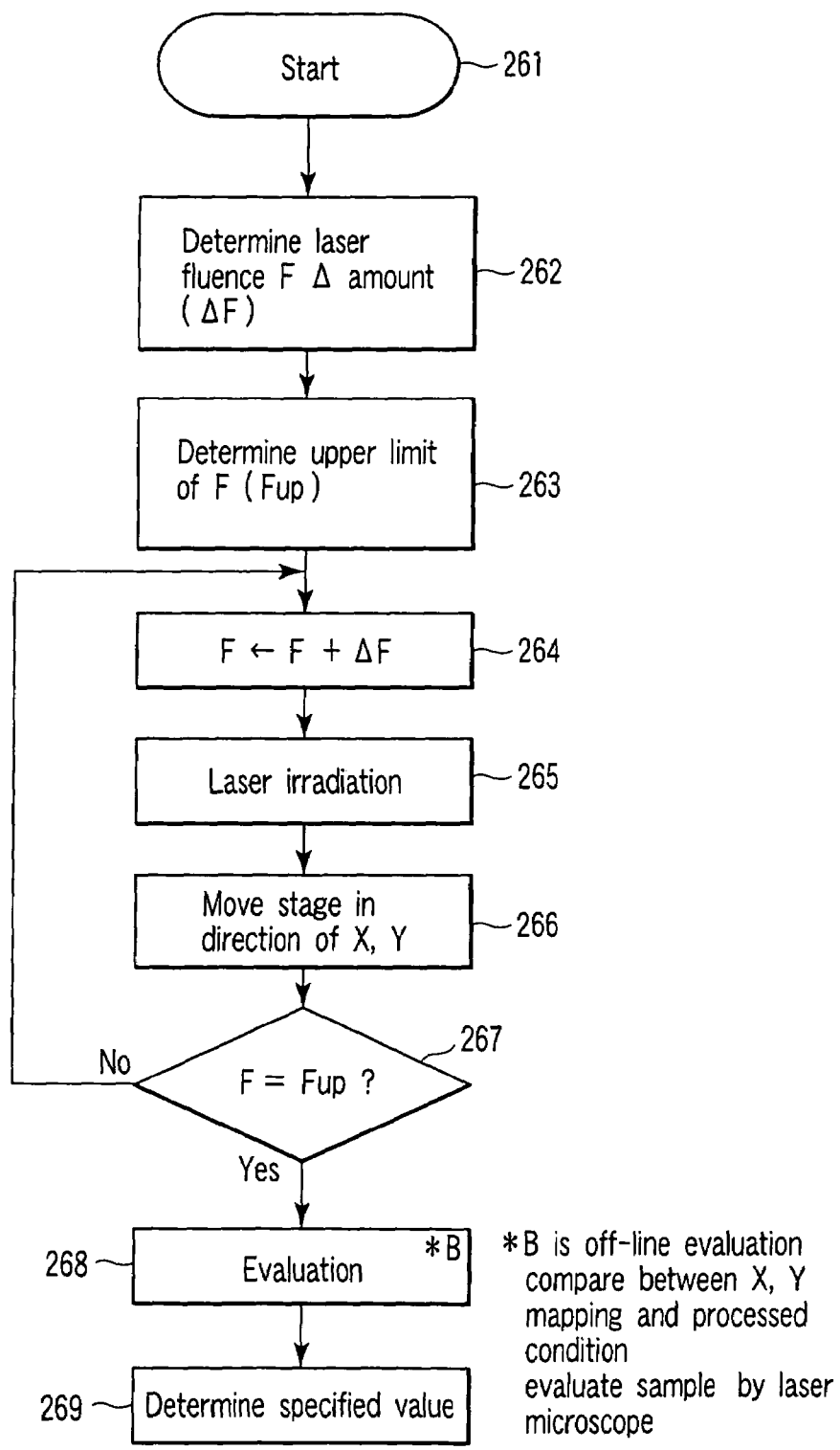
FIG. 16 is a view illustrating a process of determining a specified value depicted in FIG. 13A.

FIG. 16 shows a concrete specified value determination flowchart. A procedure of determining a specified value will now be described with reference to FIG. 16. The crystallization target substrate 227 is irradiated with the laser beam while sequentially increasing a laser intensity F (a laser fluence F), and a threshold value which is a specified value with which crystallization can be sufficiently carried out is determined based on actual measurement. First, an increase quantity ($\Delta F$) of a laser beam intensity is determined (a step 262). Then, an upper limit value (Fup) of the laser beam intensity is determined (a step 263). This is determined while considering an oscillation capability of the excimer laser beam source 221, an appropriate range at the time of continuous crystallization processing, a crystallization margin and others. The crystallization target substrate 227 is irradiated with the laser beam having a laser intensity to which the increase quantity $\Delta F$ is sequentially added (steps 264 and 265), the stage 228 is sequentially moved (a step 266), the laser beam irradiation processing for crystallization is continued, and the processing is stopped when the laser intensity reaches the upper limit value Fup (a step 267).

The crystallization target substrate 227 is taken out, and crystallinity is evaluated at the next step (a step 268). This is an off-line evaluation, and this embodiment performs processing based on Secco-etching (this is one of methods which optically evaluates a defect of a silicon crystal, and a method which performs etching processing by using a mixed chemical of HF and $K_2Cr_2O_7$) to evaluate crystallinity.

Figure 17:
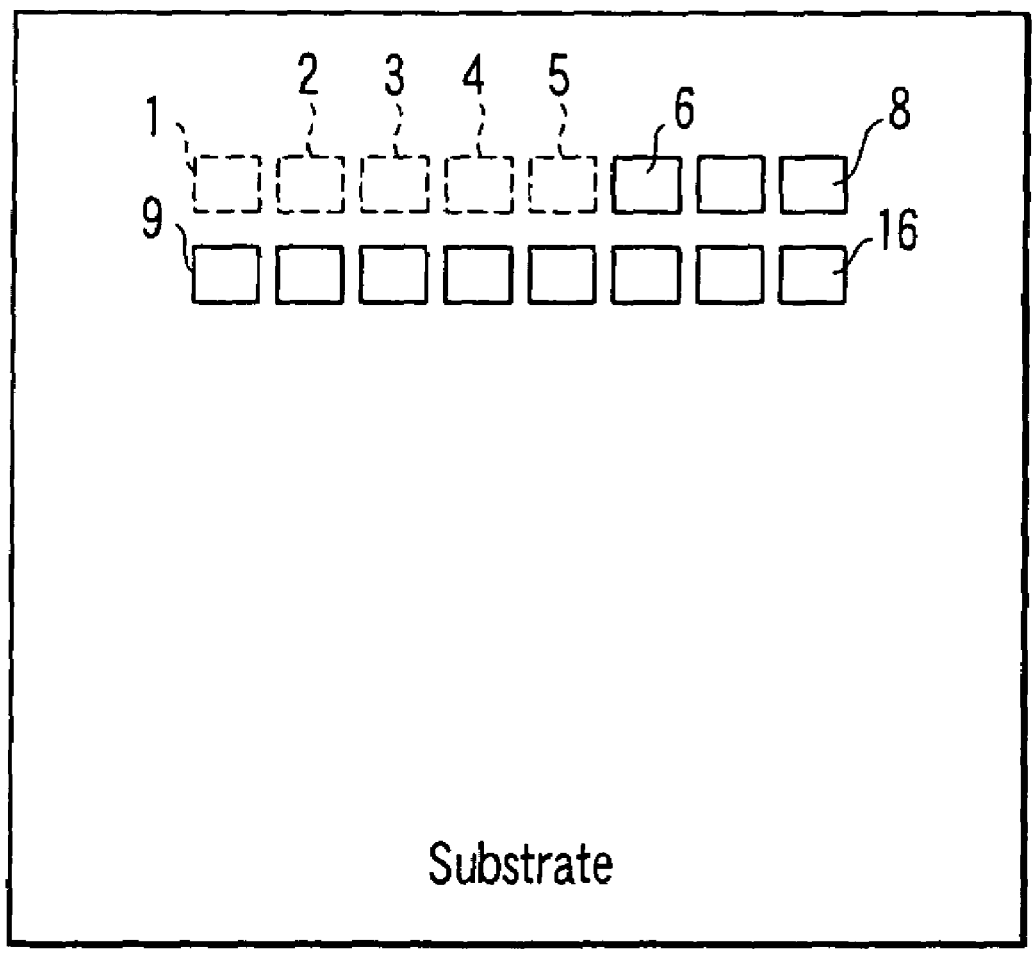
FIG. 17 is a view illustrating experimental data when determining a specified value of the crystallization apparatus and the crystallization method depicted in FIG. 16.

FIG. 17 shows the crystallization target substrate 227 subjected to the irradiation processing. Numeric symbols "1", "5", "6", "8" . . . denote an order of the irradiation processing, and each rectangle indicates a processing region based on laser irradiation for one time. It was confirmed that crystallization does not sufficiently occur in regions denoted by the numeric symbols "1" to "5", and these regions are indicated by dotted lines. Therefore, in this case, an intensity of the laser beam applied for the sixth time is a threshold value of the specified value, and a laser intensity which is not smaller than this threshold value is determined as the specified value (a step 269).

Although this experiment obtains an influence of amorphous thin film forming conditions on the specified value and thereby determines the specified value of the photodetection value while taking a crystallization evaluating method based on an electron backscattering process or TEM as an example, the present invention is not restricted to this method. For example, a light reflection factor of an irradiation target film after irradiation processing greatly differs depending on an amorphous state and a crystallized state, and the specified value may be determined with such a variable light reflection factor being used as an index. As described above, the specified value is determined based on various kinds of experimental measurement (a grain diameter of a crystal grain (a scanning electron microscope (SEM), a transmission electron microscope (TEM)), measurement of crystallinity (an electron backscattering process (EBSP), an X-ray diffraction method (XRD), a reflection high energy electron diffraction method (RHEED)), and a crystallized status (a change in a light reflection factor before and after processing, a change in electrical characteristics by using a four-terminal measurement method or the like, a change in an absorption factor of an infrared region using FTIR). Further, the present invention is not restricted to these measurement methods, and any crystallinity evaluating experiment which evaluates crystallinity can be used as means for determining the specified value.

Furthermore, in the above-described crystallinity evaluating experiment, its evaluation takes time, and hence it is difficult to immediately give feedback in the current processing process. Moreover, in non-single-crystal semiconductor films, when a once-set specified value is continuously used in a step of continuously processing non-single-crystal semiconductor films having the same element configuration (a film thickness, a film quality and film forming conditions of an amorphous thin film, a film thickness and a film quality of an insulating film, an element design and others), an operation of manually inputting the same specified value to the computer 231 or an operation of performing calculations by using the computer 231 can be eliminated, thereby providing an effective method in an allowable range of environmental variables.

EIGHTH AND NINTH EMBODIMENTS

A description will now be given as to other embodiments which use, as detection light, a part of a crystallization laser beam emitted from a laser beam source 221 as laser beam detecting means for detecting whether the laser beam is a laser beam having a predetermined specified value. FIG. 13B shows an eighth embodiment, and FIG. 13C shows a ninth embodiment. Like reference numerals denote parts equal to those in FIG. 13A, thereby eliminating their detailed explanation. In the seventh embodiment (FIG. 13A), the photodetector 229 was arranged in a transmission optical path of the half mirror 225 and, for example, a light intensity of a laser beam transmitted through the half mirror 225 was detected. However, the photodetector 229 is not restricted to this position.

In the eighth embodiment, as shown in FIG. 13B, reflected light generated when controlling a transmitted light intensity to a predetermined value by adjusting a reflected light quantity in an attenuator 222 is determined as a detection laser beam 220b, this beam is detected by the photodetector 229, and a signal having a photodetection value of the detected beam is transmitted to a computer 231 through a signal line 230. In this case, the half mirror 225 does not have to be used, and using a regular total reflection mirror 225a can suffice. The computer 231 likewise executes a step of comparing a detection value obtained by the photodetector 229 with a specified value and detecting whether the laser beam is normal or abnormal in accordance with laser oscillation from a laser beam source 221.

In the ninth embodiment, as shown in FIG. 13C, a half mirror 225b is set between an attenuator 222 and a homogenizing optical system 223, reflected light from the half mirror 225b is determined as a detection laser beam 220b so that, e.g., a light intensity of this beam is detected by a photodetector 229, and a signal having this photodetection value is transmitted to a computer through a signal line 230. The half mirror 225b used in the ninth embodiment transmits almost all laser beams 220 emitted from a laser beam source 221 therethrough as a crystallization laser beam 220a. The transmitted light is used for crystallization as the crystallization laser beam 220a for a crystallization target substrate 227. Remaining reflected weak light is detected by the photodetector 229 as a detection laser beam 220b. Therefore, although reference numerals 225 and 225b in both FIGS. 13A and 13C denote the half mirrors, their usages of transmission factors and reflection factors are different from each other in these two embodiments.

As described above, light traveling from the laser beam source 221 can suffice for the photodetector 229, and an optical path position of the laser beam source 221 is not restricted. However, it is desirable that an optical component is set in an optical path of the attenuator 222 and the following elements and the photodetector 229 detects light separated by, e.g., reflecting or transmitting means from the set optical component. That is because energy density is controlled.

10TH AND 11TH EMBODIMENTS

A description will now be given as to embodiments in which laser beam detecting means detects whether a laser beam is a laser beam having a predetermined specified value from a surface processed by the laser beam with reference to FIGS. 13D and 13E. In the seventh to ninth embodiments, the photodetector 229 performs detection, and a photodetection value of the photodetector 229 is measured to detect an abnormal shot. As 10th and 11th embodiments, a part irradiated with a crystallization laser beam 220a is directly observed to judge whether this part is crystallized, a position of this part is determined as a light intensity insufficient irradiation position when crystallization is insufficient, and laser beam irradiation processing is again performed.

First, FIG. 13D shows the 10th embodiment. Like reference numerals denote parts equal to those in FIGS. 1 and 13A, thereby eliminating their detailed explanation. As shown in FIG. 13D, a measuring instrument 229a which measures a surface state of a crystallization target substrate 227 is used to measure a change in a light receiving region, i.e., a surface state of an amorphous silicon thin film 227c after laser beam irradiation, and measurement, e.g., imaging is performed to grasp "whether a light receiving region is melted", "how much crystallization is performed" and "whether crystallization is performed". As the measuring instrument 229a, it is possible to use a color-difference meter, a spectral color-difference meter, a gloss meter, a reflectivity meter, a multi-channel spectrometer, a CCD camera, an image intensifier and others for the surface of the crystallization target substrate 27 to measure changes in optical characteristics such as a change in color, a change in gloss, a change in reflection factor and others of a crystallized thin film. According to this embodiment, it is possible to detect whether an abnormal shot is present by using an independent optical system without being affected by a laser beam having a large crystallization energy quantity.

Figure 18:
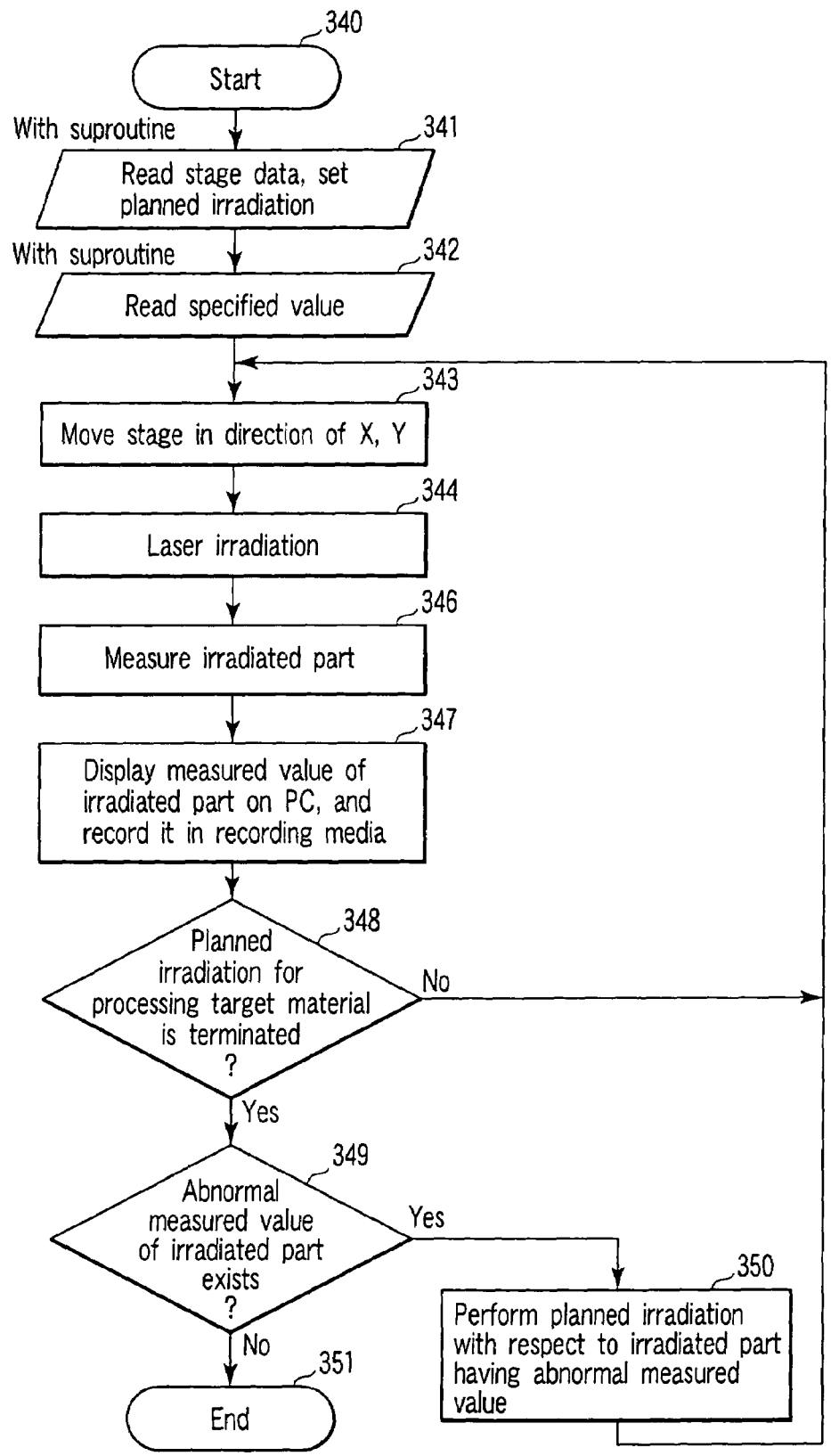
FIG. 18 is a view illustrating a process of determining a specified value according to the fourth embodiment of the present invention.

In case of the 10th embodiment, as shown in a process flowchart of FIG. 18, a step (346) of measuring an irradiation part substitutes for the step (245) of measuring a light intensity by the photodetector in the process flowchart depicted in FIG. 14. In regard to any other steps, evaluation is carried out along the same steps as those shown in FIG. 14.

Figure 19:
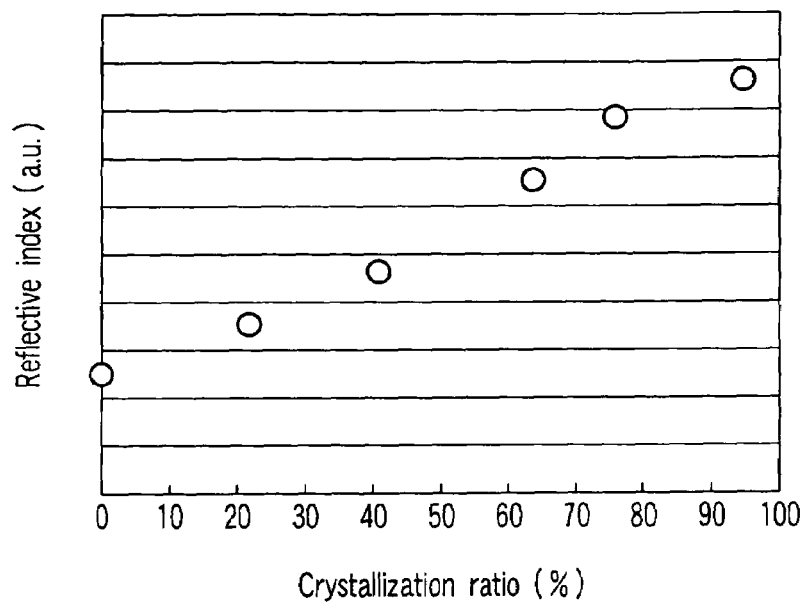
FIG. 19 is a view of experimental data when determining an irradiated part measurement value in the crystallization apparatus and the crystallization method according to the embodiment of the present invention.
Figure 20:
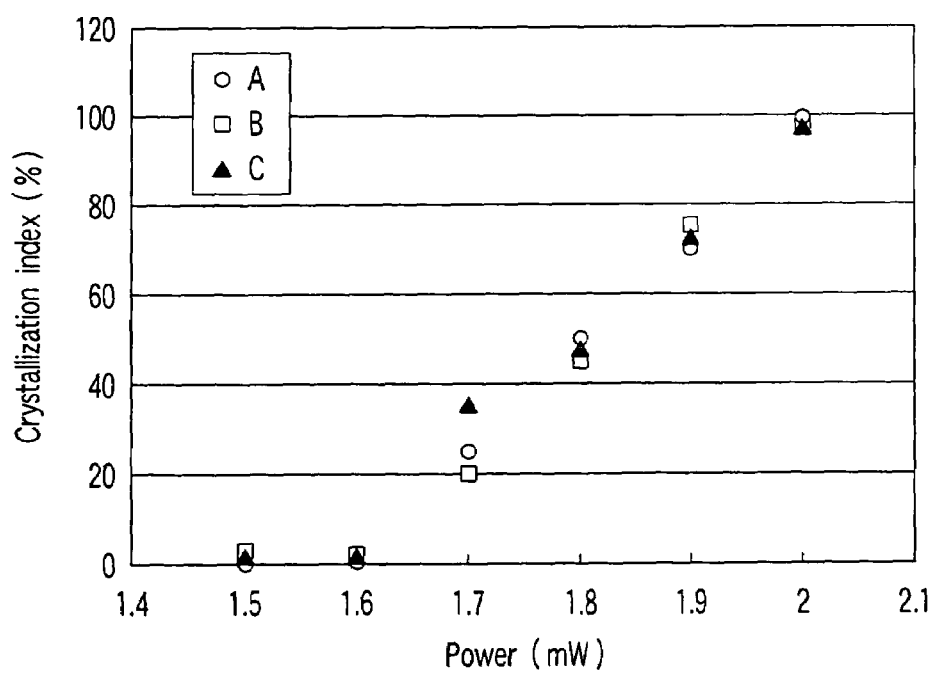
FIG. 20 is a view showing experimental data when determining a specified value in a laser processing apparatus and a laser processing method according to the embodiment depicted in FIG. 13A.

FIG. 20 shows a relationship between a light intensity and a crystallization ratio of the crystallization laser beam 220a. FIG. 19 shows a result obtained by measuring a reflection factor when irradiating a film, whose crystallization factor depicted in FIG. 20 is changed, with an He—Ne laser beam (632.8 nm). As a result, characteristics of FIG. 19 shows that measuring, e.g., a reflection factor of light can grasp a crystallization state of this part since the reflection factor of the light increases when a crystallization factor becomes high.

In the 11th embodiment, observation illumination light is applied as laser beam detecting means for detecting whether a laser beam is a laser beam having a predetermined specified value, and reflected light of this light is received and detected. In FIG. 13E, an amorphous silicon film 227c is irradiated with a laser beam 220 from an excimer laser beam source 221, and a light receiving region of the amorphous silicon film 227 is melted in case of normal light which is not smaller than the specified value. This melted region or a crystallized region is irradiated with the observation illumination light from an observation illumination light source 234, and reflected light from the melted region or the crystallized region irradiated with the observation illumination light is detected by a detector (an optical receiver) 229a. When the laser beam 220, e.g., an excimer laser beam is normal, reflected light from the melted region or the crystallized region is detected by the detector 229a. On the other hand, when the excimer laser beam is an abnormal shot, the amorphous silicon film 227c is irradiated with, e.g., the observation illumination light alone. Reflected light obtained at this moment is detected by the detector 229a, the detector 229a outputs a detection signal to a computer 231, and the computer 231 determines abnormal irradiation. In this manner, a change in a laser beam irradiation position in the non-single-crystal semiconductor film can be detected by using the reflected light.

Although the observation illumination light may be continuously applied, a change in the non-single-crystal semiconductor film may be detected based on the reflected light in association with a laser beam irradiation timing.

As the observation illumination light source 234, for example, a white light source (a xenon lamp, a tungsten lamp or the like) or a low-output laser (an He—Ne laser or the like) is set, and the reflected light is measured, thereby realizing further accurate measurement. Further, this measurement does not have to be carried out at a position irradiated with the laser beam for crystallization, and any other parts are sequentially irradiated with the laser beam after the foregoing irradiation. It is good enough to measure a surface state at a place apart from a crystallized position. Furthermore, reflected light and stray light from the crystallization excimer laser beam are reduced that way, thereby achieving accurate measurement.

12TH EMBODIMENT

A description will now be given as to an embodiment which performs detection from light obtained by transmitting a laser beam through a crystallization target substrate 227 as laser beam detecting means for detecting whether the laser beam is a laser beam having a predetermined specified value. FIG. 13F shows a 12th embodiment. Like reference numerals denote parts equal to those in FIG. 13A, thereby eliminating their detailed explanation. When a substrate of the crystallization target substrate 227 is a transparent substrate such as glass, measuring transmitted light can measure a crystallization state of this thin film. A transmitted light detector 229b shown in FIG. 13F can be used to measure light transmitted through the crystallization target substrate 227, and a crystallization factor can be measured by utilizing a transmission factor of the measured light.

According to the foregoing embodiment, even if an abnormal shot occurs in irradiation of a laser beam for crystallization, laser crystallization can be excellently effected by detecting this shot without lowering a yield ratio.

A crystallization process used in this experiment will now be concretely described with reference to FIGS. 21 and 22. As shown in FIG. 21, a laser crystallization apparatus 201 comprises: an illumination system 202; an optical element 224 provided on an optical axis of this illumination system 202; an image forming optical lens system 226 provided on an optical axis of this optical element 224; a crystallization target substrate 227 provided on an optical axis of this image forming optical lens system 226; and a stage (a sample stage) 228 which supports the substrate.

Figure 22:
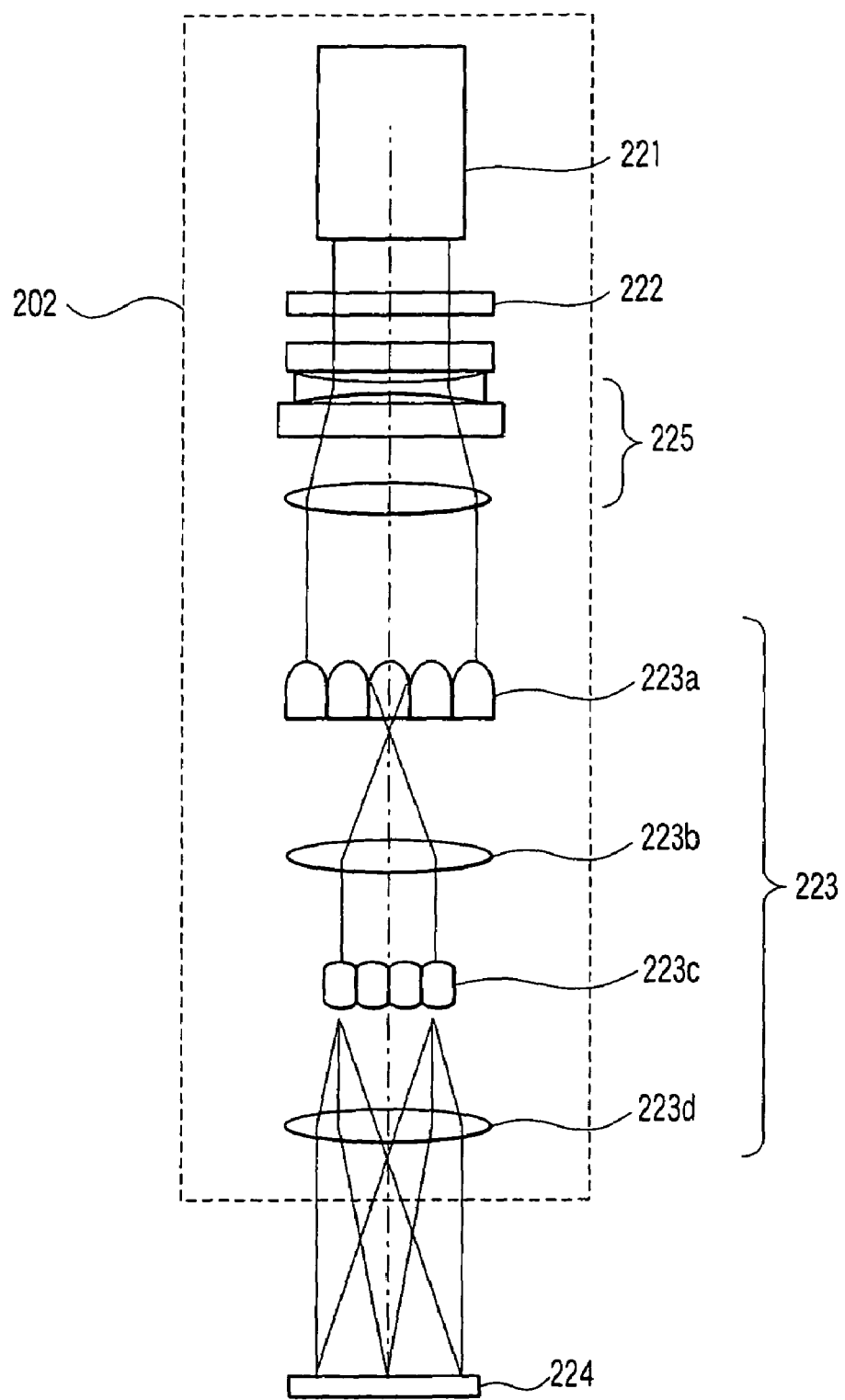
FIG. 22 is a view illustrating an optical configuration of an illumination optical system depicted in FIG. 21.

The illumination system 202 is an optical system shown in FIG. 22, and constituted of, e.g., a light source 221, an attenuator 222, a beam expander 225 and a homogenizing optical system 223. The excimer laser beam source 221 includes an XeCl excimer laser beam source 221 which supplies light having a wavelength of, e.g., 308 nm. It is to be noted that, as the light source 221, an excimer laser such as a KrF excimer laser which emits pulse light having a wavelength of 248 nm or an ArF laser which emits pulse light having a wavelength of 193 nm is optimum. Furthermore, the light source 221 may be a YAG laser beam source. As the light source 221, it is possible to use any other appropriate light source which outputs an energy which fuses a non-single-crystal semiconductor film, e.g., an amorphous silicon film 227c. The attenuator 222, the beam expander 225 and the homogenizing optical system 223 are provided on an optical axis of a laser beam emitted from the light source 221.

As shown in FIG. 22, the homogenizing optical system 223 has a configuration in which, e.g., a first fly-eye lens 223a, a first condenser optical system 223b, a second fly-eye lens 223c and a second condenser optical system 223d are provided on an optical axis of the excimer laser beam emitted from the light source 221. The homogenizing optical system 223 homogenizes a light intensity of the laser beam emitted from the light source 221 in a cross section of a light beam.

That is, in the illumination system 202, the laser beam emitted from the light source 221 is shaped through the attenuator 222 and the beam expander 225, and then enters the first fly-eye lens 223a. A plurality of light sources are formed on a rear focal plane of this first fly-eye lens 223a, light beams from the plurality of light sources illuminate an incidence surface of the second fly-eye lens 223c through the first condenser optical system 223b in a superimposing manner. As a result, more light sources are formed on a rear focal plane of the second fly-eye lens 223c than those on the rear focal plane of the first fly-eye lens 223a. Light beams from many light sources formed on the rear focal plane of the second fly-eye lens 223c fall on the optical element 224 through the second condenser optical system 223c, and illuminate this element in a superimposing manner. The first fly-eye lens 223a and the first condenser optical system 223b of the homogenizing optical system 223 constitute a first homogenizer, and the second fly-eye lens 223c and the second condenser optical system 223d of the same constitute a second homogenizer. These two homogenizers are used to homogenize a light intensity at each in-plane position on the optical element 224. In this manner, the illumination system 202 forms a laser beam having a substantially homogeneous light intensity distribution, and the optical element 224 is irradiated with this laser beam.

The optical element 224 is an optical component having a function of shaping a light intensity distribution, and it may be, e.g., a metal mask having a rectangular opening portion, or an optical mask having, as a base material, quartz or the like obtained by depositing a non-translucent material on a translucent optical component such as quartz and removing the non-translucent material in a rectangular shape by etching. Moreover, the optical element 224 may be, e.g., a phase shifter, and the phase shifter is an optical element which emits a laser beam having an arbitrary light intensity distribution by locally modulating a phase of light exiting from the homogenizing optical system 223.

The phase shifter is obtained by forming a step (irregularities) on a transparent body, e.g., a quartz substrate. In general, assuming that a wavelength of a laser beam is $\lambda$, when a transparent medium having a refraction factor n is formed on the transparent substrate to provide a phase difference of $\theta$, a film thickness t of the transparent medium is given by an expression $t=\lambda \cdot \theta/(2\pi(n-1))$. Assuming that a refraction factor of the quartz substrate is 1.46, since a wavelength of an XeCl excimer laser beam is 308 nm, a step of 334.8 nm is formed by a method of photo-etching or the like in order to provide a phase difference of 180°. An intensity of a laser beam transmitted through the phase shifter having a line-and-space pattern, e.g., a phase difference of 180° demonstrates a periodic strong-and-weak pattern.

Additionally, in case of forming a film with an SiNx film being used as a transparent medium by PECVD, LPCVD or the like, assuming that a refraction factor of the SiNx film is 1, it is good enough to form the SiNx film with a film thickness of 154 nm on the quartz substrate and perform photo-etching to provide a step.

The laser beam subjected to phase modulation in the optical element 224 falls on the crystallization target substrate 227 through the image forming optical lens system 226. Here, the image forming optical lens system 226 is arranged in such a manner that a pattern surface of the optical element 224 and the crystallization target substrate are optically conjugate. In other words, a height position of the stage 228 is corrected so that the crystallization target substrate 227 is set on a surface (an image surface of the image forming optical lens system 226) which is optically conjugate with the pattern surface of the optical element 224. The image forming optical lens system 226 includes an aperture diaphragm 226c between a positive lens group 226a and a positive lens group 226b. The image forming optical lens system 226 is an optical lens which maintains a size of an image of the optical element 224 or reduces the same to, e.g., ⅕ and forms the obtained image on the crystallization target substrate 227.

Additionally, as shown in FIG. 21, a silicon oxide layer as an underlying insulating layer 227b is formed on a glass substrate 227a which is, e.g., liquid crystal display glass by a chemical vapor deposition method (CVD) or a sputtering method. A non-single-crystal semiconductor film 227c, e.g., an amorphous silicon film is formed as a crystallization target layer on this silicon oxide layer. Further, a silicon oxide layer 227d as a cap film is sequentially formed on this amorphous silicon film, thereby obtaining the crystallization substrate 227.

The underlying insulating layer 227b is formed of, e.g., $SiO_2$ with a film thickness of 200 to 1000 nm. The underlying insulating layer 227b prevents a foreign particle from entering the amorphous silicon film 227c, the foreign particle being Na or the like separated out from the glass substrate 227a when the non-single-crystal semiconductor film 227c, e.g., an amorphous silicon film directly comes into contact with the glass substrate 227a. Furthermore, the underlying insulating layer 227b also prevents a melting temperature during the crystallization process of the amorphous silicon film 227c from being directly transmitted to the glass substrate 227b, and hence it contributes to crystallization with a large grain diameter by a thermal storage effect of the melting temperature.

The amorphous silicon film 227c is a film subjected to crystallization processing, and its film thickness is selected to be 30 to 260 nm, e.g., 100 nm. The cap film 227d stores heat generated when the amorphous silicon film 227c is melted at the crystallization step, and this thermal storage function distributes to formation of a crystallized area with a large grain diameter. This cap film is an insulating film, e.g., a silicon oxide film ($SiO_2$), and its film thickness is 100 to 400 nm, e.g., 170 nm.

The crystallization target substrate 227 is automatically carried onto the stage 228 of the laser crystallization apparatus 1, located and mounted at a predetermined position, and held by a vacuum chuck.

The crystallization process will now be described with reference to FIGS. 21 and 22. A pulsed laser beam emitted from the excimer laser beam source 221 is adjusted to have a predetermined energy, e.g., 700 mJ/cm$^2$ by the attenuator 222, and then enters the homogenizing optical system 223. The homogenizing optical system 223 homogenizes a light intensity within a beam diameter of the incident laser beam.

The laser beam is an XeCl excimer laser beam having a wavelength of 308 nm, and pulse duration of one shot is 30 nsec. When the optical element 224 is irradiated with the pulsed laser beam under the above-described conditions, the pulsed laser beam which has entered the optical element 224 provokes diffraction and interference at a step portion. As a result, the optical element 224 generates a strong-and-weak light intensity distribution with an inverse peak pattern shape indicative which periodically varies.

It is desirable to output a laser beam intensity with which the amorphous silicon layer 227c is melted in a range from the minimum light intensity to the maximum light intensity in this strong-and-weak light intensity distribution with the inverse peak pattern shape. The pulsed laser beam transmitted through the optical element 224 is condensed on the crystallization target substrate 227 by the image forming optical lens system 226 and enters the amorphous silicon film 227c.

That is, the incident pulsed laser beam is transmitted through almost all of the silicon oxide layer 227d as the cap film, and absorbed into the amorphous silicon film 227c. As a result, an irradiation target region of the amorphous silicon film 227c is heated and melted. Heat generated from melting is stored in the silicon oxide layers 227b and 227d.

Upon completion of irradiation of the pulsed laser beam, a temperature in the irradiation target region of the amorphous silicon film 227c is going to be lowered at a high speed, but heat stored in the cap film 227d and the underlying insulating layer 227b provided on both front and rear sides greatly slows down a temperature reduction speed. At this time, a temperature in the irradiation target region is reduced in accordance with the light intensity distribution generated by the optical element 224, and a crystal sequentially grows in a lateral direction.

In this manner, the crystallization step using one pulsed laser beam is terminated. As described above, a crystal grain having a size which is sufficient to form one or more TFTs is formed.

The crystallization apparatus 201 automatically irradiates the next crystallization target region of the amorphous silicon film 227c with the pulsed laser beam based on a previously stored program, thereby forming a crystallized region. Movement to the next crystallization target position can be effected by moving the stage 228 so that the crystallization target position can be selected.

When the crystallization target region is selected and positioning is finished, the next pulsed laser beam is emitted. Repeating such a laser beam shot, a large area in the crystallization target substrate 27 can be crystallized. In this manner, the crystallization step can be terminated.

Figure 23:
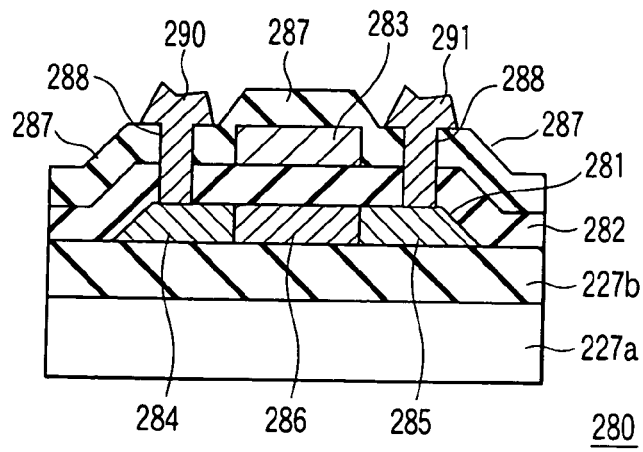
FIG. 23 is a perspective view illustrating a configuration of TFT formed on substrate to be processed depicted in FIG. 21.

An embodiment of a TFT and a display device using this TFT will now be described with reference to FIGS. 23 and 24. First, a configuration and a manufacturing method of an embodiment of a thin film transistor (TFT) will be described. Like reference numerals denote parts equal to those in FIGS. 1 and 13A to 22, thereby eliminating their tautological detailed explanation.

A thin film transistor 280 was formed on a crystallization target substrate 227 having a crystalline silicon film 281 (an amorphous silicon film 227c) whose crystal grain was increased in size by the crystallization apparatus 201 shown in FIG. 21. That is, a cap film 227d was removed by etching, then etching was performed in such a manner that a channel region of each TFT can remain in an island shape in each crystallization target region (a crystalline silicon film) of the crystalline silicon film whose crystal grain was increased in size. In this manner, an Si island having a predetermined pattern was formed on a substrate 227a.

Then, a gate insulating film 282 is formed on the crystalline silicon film 281. The gate insulating film 282 is formed of a material mainly containing silicon oxide ($SiO_2$) or silicon oxynitride (SiON). This gate insulating film 282 is obtained by forming a silicon oxide film having a thickness of, e.g., 30 to 120 nm. This silicon oxide film is the gate insulating film 282 formed of $SiH_4$ and $N_2O$ as raw materials with a thickness of 50 nm by, e.g., a plasma CVD method.

Then, an electroconductive layer is formed in order to constitute a gate electrode 283 on the gate insulating film 282. This electroconductive layer is formed of a material mainly containing an element such as Ta, Ti, W, Mo or Al by using a known film forming method such as a sputtering method or a vacuum evaporation method. As the gate electrode 283, an Al—Ti ally film was formed. As to this Al—Ti alloy film, a gate electrode metal layer was patterned by using photolithography to form the gate electrode 283 having a predetermined pattern.

Then, a source region 284 and a drain region 285 were formed by ion-implanting an impurity required to form the source region 284 and the drain region 285 into the crystalline silicon film 281 with the gate electrode 283 being used as a mask. As to a source region 252b and a drain region 252c, in case of forming, e.g., a p channel type TFT, a p type impurity such as a boron ion is implanted by using an ion implantation method. A boron concentration in this region was set to, e.g., $1.5 \times 10^{20}$ to $3 \times 10^{21}$. In this manner, a high-concentration p type impurity region constituting each of the source region 84 and the drain region 85 of the p channel type TFT was formed. In regard to implantation of an impurity, it is needless to say that implanting an n type impurity can form an n channel type TFT. As a result, a crystalline silicon film 81 below the gate electrode 83 becomes a channel region 86 by forming the source region 84 and the drain region 85.

Then, a heat treatment process was carried out in order to activate the impurity element implanted by the ion implantation method. This process can be performed by a furnace crystallization method, a laser crystallization method, a rapid thermal crystallization method or the like. In this embodiment, the activation process was conducted by the furnace crystallization method. In regard to a heat treatment of this activation process, the heat treatment was performed at 300 to 650° C., e.g., 500° C. in a nitrogen atmosphere for four hours.

Then, an interlayer insulating film 287 is formed on the gate insulating film 282 including the upper side of the gate electrode 83. As the interlayer insulating film 287, it is desirable to use a laminated film formed of, e.g., a silicon nitride film, a silicon oxide film, a silicon oxynitride film or a combination of these films. Further, it is good enough to set a film thickness of the interlayer insulating film 287 to 200 to 600 nm, and 400 nm was selected in this embodiment.

Then, each contact hole 88 which is in contact with an electrode of the source region 284 or the drain region 285 was formed at a predetermined position of the interlayer insulating film 287. Then, an electroconductive layer was formed in the contact hole 288 and on the surface of the interlayer insulating layer 287, and a source electrode 290 and a drain electrode 291 were formed. In this embodiment, the electroconductive layer for the source and drain electrodes 290 and 291 is a laminated film having a three-layer configuration obtained by continuously forming, e.g., a Ti film with a thickness of 100 nm, an aluminum film containing Ti with a thickness of 300 nm and a Ti film with a thickness of 150 mm by a sputtering method. The thin film transistor 280 shown in FIG. 23 was manufactured in this manner.

Then, a description will now be given as to an example in which the thin film transistor 280 obtained in the above embodiment is actually applied to a display device, e.g., an active matrix type liquid crystal display device with reference to FIG. 24.

Figure 24:
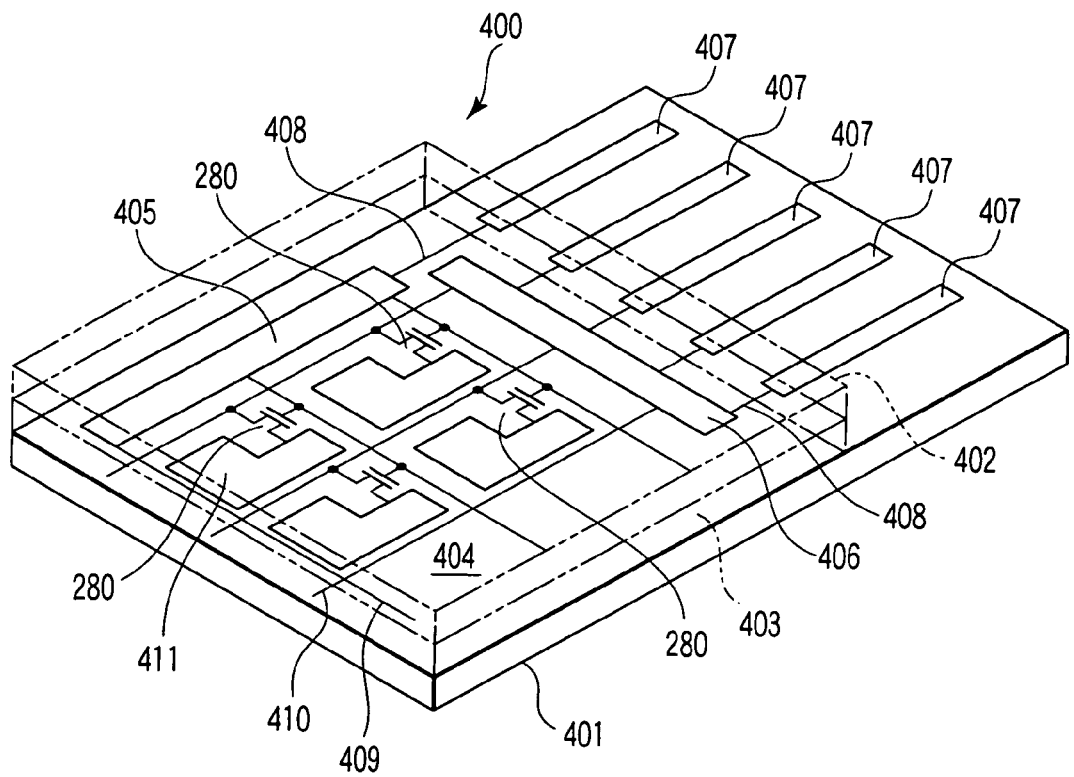
FIG. 24 is a perspective view illustrating a configuration of a display device in which TFTs depicted in FIG. 23 are formed.

FIG. 24 is a view illustrating an example of an active matrix type display device using the thin film transistor 280. A display device 400 has a panel configuration including an electro-optic material 403 held between a pair of opposing insulating substrates 401 and 402. As the electro-optic material 403, a liquid crystal material is extensively used. A pixel array portion 404 and a drive circuit portion are integrated and formed on the lower insulating substrate 401, e.g., a glass substrate. The drive circuit portion is divided into a vertical drive circuit 405 and a horizontal drive circuit 406, and they are integrated around the pixel array portion 404. That is, the pixel array portion 404 and the drive circuit portion can be formed on one glass substrate.

Furthermore, terminal portions 407 for external connection are formed at a peripheral upper end of the insulating substrate 401. The terminal portions 407 are connected with the vertical drive circuit 405 and the horizontal drive circuit 406 through wirings 408. Gate wirings 409 in rows and signal wirings 410 in columns are formed on the pixel array portion 404. A pixel electrode 411 and a thin film transistor 480 driving this electrode are formed at each intersection of these wirings. A gate electrode 283 of the thin film transistor 280 is connected with a corresponding gate wiring 409, a source electrode 290 of the same is connected with a corresponding signal wiring 410, and a drain electrode 291 of the same is connected with a corresponding pixel electrode 411. The gate wiring 409 is connected with the vertical drive circuit 405 and, on the other hand, the signal wiring 410 is connected with the horizontal drive circuit 406.

The thin film transistor 280 which drives the pixel electrode 411 to be switched and the thin film transistor included in each of the vertical drive circuit 405 and the horizontal drive circuit 406 are manufactured in accordance with the present invention, and their mobility is higher than that in the prior art. Therefore, it is possible to integrate and form not only the drive circuit but also a processing circuit having higher performance.

Figure 25:
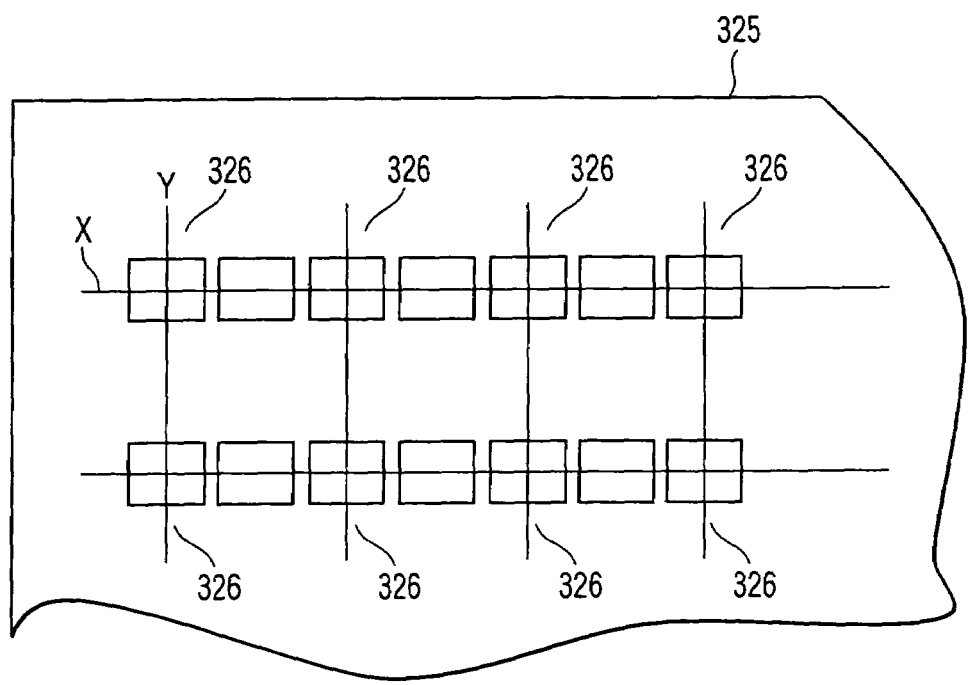
FIG. 25 is a partially cutaway plan view of a display panel illustrating another embodiment of FIG. 1D.
Figure 26:
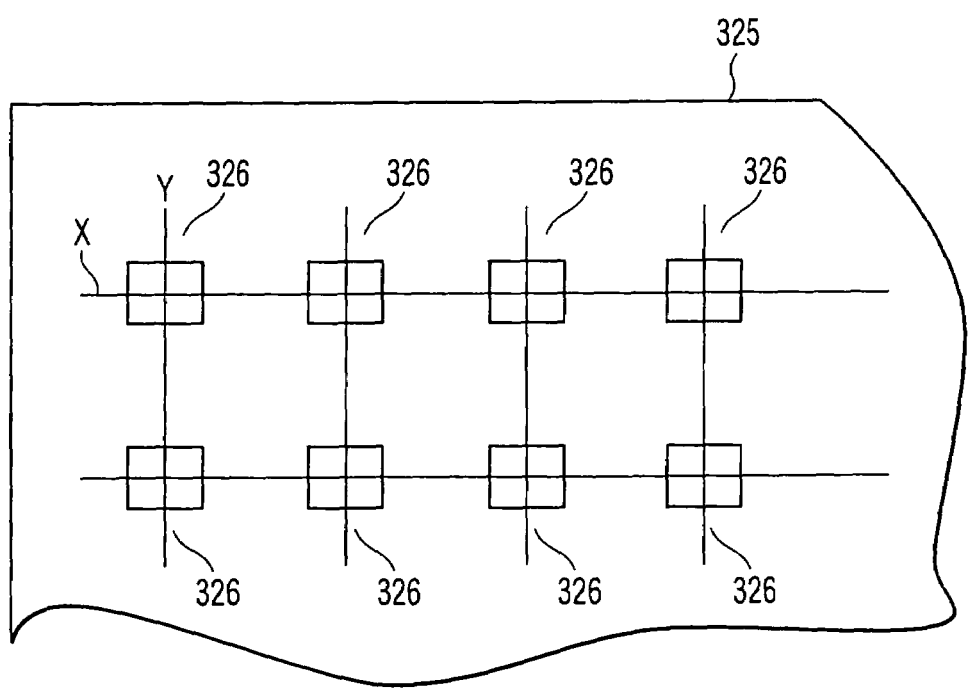
FIG. 26 is a partially cutaway plan view of a display panel illustrating another embodiment of FIG. 1D.

An embodiment shown in FIGS. 25 and 26 is an embodiment in which a region in which a switching circuit provided in each pixel portion 326 is formed is selectively crystallized in a non-single-crystal semiconductor film formed in a display panel 325 of an active matrix type display device. FIG. 25 is a partially cutaway plan view of the display panel 325, showing a state in which a stage 228 having a crystallization target substrate 227 mounted thereon is step-fed at a fixed pitch in the form a rectangular pattern.

This embodiment is an embodiment in which a laser beam 220 is emitted from a laser beam source 221 to thereby effect crystallization only when the stage 228 is step-fed to each pixel portion 326 alone which is each intersection of data lines X and scanning lines Y in FIG. 25. That is, this is an example in which the laser beam source 221 emits the laser beam 220 only when the stage 228 is step-fed to each pixel portion only, and a standby mode begins without emitting the laser beam 220 when the stage 228 is step-fed to a part between the respective pixel portions 326. In this control, the stage 228 having the display panel 325 mounted thereon is controlled by a program previously stored in a computer 231 with which a crystallization apparatus automatically executes a crystallization process, and a laser oscillation control signal is output to the laser beam source 221 when a signal of a position corresponding to the pixel portion 326 is received from the pixel panel 325 mounted on this stage 228. The computer 231 does not output the laser oscillation control signal to the laser beam source 221 when a signal of a position corresponding to a space between the respective pixel portions from the display panel 325 mounted on the stage 228 is received.

In this manner, when the stage 228 is step-fed to a part between the respective pixel portions 326, the laser beam source 221 enters the standby mode without emitting the laser beam 220 and, in this embodiment, this is a case where this state is not stored as abnormal shot position information. That is, this embodiment is a case where a timing at which no laser beam is emitted from the laser beam source 221 is preset as a normal operation and this operation is not determined as abnormal shot position information. This operation can be constituted by previously programming unnecessariness for application of the laser beam in the computer 231.

Moreover, FIG. 26 shows an embodiment in which programming is performed in advance in such a manner that a stage 228 having a display panel 325 mounted thereon is supplied at a pitch of respective pixel portions 326 which are regularly provided. This embodiment is an example in which whether a predetermined quantity of a laser beam 220 is emitted from a laser beam source 221 is monitored at a position to which the stage 228 is step-fed and the laser beam is reapplied at a later step.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A processing apparatus using a pulsed laser beam, comprising:

a laser beam source which emits a pulsed laser beam;

a homogenizer optical system which homogenizes an intensity of the laser beam emitted from the laser beam source in a two-dimensional plane;

an irradiating section for irradiating a position of a processing target with the homogenized pulsed laser;

a storing section for storing the position irradiated by the irradiating section;

a monitoring section for monitoring an intensity of light reflected by the processing target;

a first mechanism for irradiating the next irradiation position of the processing target with a homogenized pulsed laser beam when it is determined that the light intensity is normal with respect to a predetermined set value for processing the processing target as a result of monitoring by the monitoring section; and a second mechanism for returning to and again irradiating an insufficient position of the processing target stored in the storing section with the laser beam from the laser beam source when it is determined that the light intensity is insufficient with respect to a predetermined set value for processing the processing target as a result of the monitoring by the monitoring section.

2. The processing apparatus according to claim 1, further comprising, at an imaging position of the homogenizer optical system, a phase modulation element which phase-modulates the homogenized laser beam.

3. A processing apparatus using a pulsed laser beam, comprising:

a laser beam source which emits a pulsed laser beam;

a homogenizer optical system which homogenizes an intensity of the laser beam emitted from the laser beam source in a two-dimensional plane;

processing section for irradiating a processing target with the homogenized laser beam to subject the processing target to laser processing;

a storing section for storing a position of the processing target irradiated by the processing section;

an optical monitoring portion which optically monitors a processing state of an irradiation position in accordance with the pulsed laser beam emitted from the laser beam source;

first mechanism for irradiating a next irradiation position of the processing target with the pulsed laser beam when it is detennined that a processing state is a predetermined state which is normal as a result of the monitoring; and second mechanism for returning to and again irradiating a non-normal processing position of the processing target stored in the storing section with the laser beam from the laser beam source when it is determined that a processing state is not a predetermined state which is non-normal as a result of the monitoring.

4. The processing apparatus according to claim 3, further comprising, at an imaging position of the homogenizer optical system, a phase modulation element which phase-modulates the homogenized laser beam.

5. A laser crystallization apparatus which irradiates a non-single-crystal semiconductor film with a laser beam emitted from a laser which performs pulsed oscillation to thereby carry out crystallization, having:

laser beam detecting section for detecting the laser beam; and a computer which compares a detection value detected by the laser beam detecting section with the predetermined set value necessary for crystallization, stores irradiation position information of the non-single-crystal semiconductor film as abnormal shot position information when the detection value does not fall within a range of the set value, reads the abnormal shot position information when another light receiving region is irradiated with the laser beam and laser beam irradiation of the non-single-crystal semiconductor film is terminated, and again issues a laser beam irradiation command to the laser beam source to irradiate the abnormal shot position.

6. The laser crystallization apparatus according to claim 5, wherein the laser beam irradiating the non-single-crystal semiconductor film is phase-modulated.

7. A laser crystallization apparatus which irradiates a non-single-crystal semiconductor film with a laser beam emitted from a laser which performs pulsed oscillation to thereby carry out crystallization, having:

a laser beam source which performs pulsed oscillation with respect to the laser beam;

a homogenizer optical system which is provided in a laser optical path from the laser beam source, and homogenizes an intensity of the laser beam in a two-dimensional space;

an optical element which is provided in a laser optical path from the homogenizer optical system, and forms a light intensity gradient in the homogenized laser beam;

a sample stage which is provided in a laser optical path from the optical element, on which a non-single-crystal semiconductor film, whose light receiving region is at least partially melted when the laser beam is received, is mounted thereon, and which is configured to move to a predetermined other light receiving region;

laser beam detecting section for detecting the laser beam; and a computer which compares a detection value detected by the laser beam detecting section with the predetermined set value necessary for crystallization, stores irradiation position information of the non-single-crystal semiconductor film as abnormal shot position information when the detection value does not fall within a range of the set value, reads the abnormal shot position information when another light receiving region is irradiated with the laser beam and laser beam irradiation of the non-single-crystal semiconductor film is terminated, and again issues a laser beam irradiation command to the laser beam source to irradiate the abnormal shot position.

\* \* \* \* \*